United States Patent
Lee et al.

(10) Patent No.: US 10,696,016 B2
(45) Date of Patent: Jun. 30, 2020

(54) WINDOW FILM AND FLEXIBLE DISPLAY INCLUDING THE SAME

(71) Applicant: Samsung SDI Co., Ltd., Yongin-si, Gyeonggi-do (KR)

(72) Inventors: Jung Hyo Lee, Suwon-si (KR); Sung Han Kim, Suwon-si (KR); Si Kyun Park, Suwon-si (KR); Joo Hui Kim, Suwon-si (KR); Eun Su Lee, Suwon-si (KR); Jin Hee Choi, Suwon-si (KR); Nak Hyun Sung, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 330 days.

(21) Appl. No.: 15/222,880

(22) Filed: Jul. 28, 2016

(65) Prior Publication Data

US 2017/0028677 A1 Feb. 2, 2017

(30) Foreign Application Priority Data

Jul. 31, 2015 (KR) .................. 10-2015-0109216
Aug. 28, 2015 (KR) .................. 10-2015-0122152
Mar. 7, 2016 (KR) .................. 10-2016-0027328

(51) Int. Cl.
*B32B 7/12* (2006.01)
*B32B 27/06* (2006.01)
(Continued)

(52) U.S. Cl.
CPC ............ *B32B 7/12* (2013.01); *B32B 27/06* (2013.01); *B32B 27/281* (2013.01);
(Continued)

(58) Field of Classification Search
CPC ................................. B32B 7/12; B32B 27/06; B32B 27/08; B32B 27/283; B32B 2255/10;
(Continued)

(56) References Cited

U.S. PATENT DOCUMENTS

2003/0176124 A1* 9/2003 Koike ............. B32B 17/10018
442/16
2006/0057367 A1 3/2006 Sherman et al.
(Continued)

FOREIGN PATENT DOCUMENTS

CN 1462237 A 12/2003
CN 1708705 A 12/2005
(Continued)

OTHER PUBLICATIONS

CN Office action for corresponding Chinese Patent Application No. 201610617167.1, dated Jul. 26, 2018, 10 pages.

*Primary Examiner* — Scott R. Walshon
*Assistant Examiner* — Jasper Saberi
(74) *Attorney, Agent, or Firm* — Lewis Roca Rothgerber Christie LLP

(57) ABSTRACT

A window film and a flexible display including the same. The window film includes a base layer, a window coating layer on a surface of the base layer, and a back coating layer on another surface of the base layer, wherein the window coating layer is formed from a composition for window coating layers comprising a silicon-based resin, and the window film has an elastic modulus of about 1,000 Mpa or more on the back coating layer and has a pencil hardness of about 6H or higher on an adhesive layer.

27 Claims, 3 Drawing Sheets

(51) Int. Cl.
| | |
|---|---|
| *B32B 27/28* | (2006.01) |
| *C09D 133/14* | (2006.01) |
| *C09D 183/06* | (2006.01) |
| *G02B 1/10* | (2015.01) |
| *G02B 1/14* | (2015.01) |
| *C08K 3/36* | (2006.01) |
| *C08G 77/14* | (2006.01) |
| *B32B 27/08* | (2006.01) |

(52) U.S. Cl.
CPC .......... *B32B 27/283* (2013.01); *C09D 133/14* (2013.01); *C09D 183/06* (2013.01); *G02B 1/10* (2013.01); *G02B 1/14* (2015.01); *B32B 27/08* (2013.01); *B32B 2255/10* (2013.01); *B32B 2255/26* (2013.01); *B32B 2255/28* (2013.01); *B32B 2307/4026* (2013.01); *B32B 2307/412* (2013.01); *B32B 2307/51* (2013.01); *B32B 2307/536* (2013.01); *B32B 2307/546* (2013.01); *B32B 2307/584* (2013.01); *B32B 2457/20* (2013.01); *B32B 2457/202* (2013.01); *B32B 2457/204* (2013.01); *B32B 2457/206* (2013.01); *B32B 2457/208* (2013.01); *C08G 77/14* (2013.01); *C08K 3/36* (2013.01); *C08K 2201/003* (2013.01); *C08K 2201/011* (2013.01)

(58) Field of Classification Search
CPC ............ B32B 2255/26; B32B 2255/28; B32B 2307/412; B32B 2307/4026; B32B 2307/51; B32B 2457/20; B32B 2457/202; B32B 2457/204; B32B 2457/206; B32B 2457/208; B32B 2307/536; B32B 2307/546; B32B 2307/584; B32B 2551/00; G02B 1/10; G02B 1/14; G02B 1/16; G02B 1/18; G02B 1/04; C09D 183/04; C09D 183/06; C09D 183/08
See application file for complete search history.

(56) References Cited

U.S. PATENT DOCUMENTS

| | | | |
|---|---|---|---|
| 2006/0108050 A1* | 5/2006 | Satake | B32B 3/02 156/101 |
| 2008/0097066 A1* | 4/2008 | Tsuchida | C09D 183/04 528/26 |
| 2008/0177000 A1 | 7/2008 | Ahn et al. | |
| 2012/0243115 A1* | 9/2012 | Takamiya | B29D 11/0073 359/894 |
| 2013/0177748 A1* | 7/2013 | Hirai | B32B 27/08 428/203 |
| 2014/0050909 A1* | 2/2014 | Choi | B32B 7/12 428/217 |
| 2014/0338959 A1* | 11/2014 | Jung | G06F 3/041 174/253 |
| 2015/0252212 A1* | 9/2015 | Kang | C09D 135/02 428/209 |
| 2016/0297178 A1* | 10/2016 | Kang | C08B 37/0012 |

FOREIGN PATENT DOCUMENTS

| | | | |
|---|---|---|---|
| CN | 103192558 A | 7/2013 | |
| CN | 104105598 A | 10/2014 | |
| CN | 104115238 A | 10/2014 | |
| JP | 2007-127823 A | 5/2007 | |
| JP | 2009-529436 | 8/2009 | |
| JP | 2015-508345 | 3/2015 | |
| KR | 2011-0087497 | 8/2011 | |
| KR | 10-2014-0104175 A | 8/2014 | |
| KR | 10-2014-0111884 A | 9/2014 | |
| TW | 201335313 A | 9/2013 | |
| TW | 201500483 A | 1/2015 | |
| WO | WO-2015076567 A1 * | 5/2015 | ............ B32B 27/06 |

* cited by examiner

WINDOW FILM AND FLEXIBLE DISPLAY INCLUDING THE SAME

CROSS-REFERENCE TO RELATED APPLICATION

This application claims priority to and the benefit of Korean Patent Application No. 10-2015-0109216, filed on Jul. 31, 2015, in the Korean Intellectual Property Office, Korean Patent Application No. 10-2015-0122152, filed on Aug. 28, 2015, in the Korean Intellectual Property Office, and Korean Patent Application No. 10-2016-0027328, filed on Mar. 7, 2016, in the Korean Intellectual Property Office, the entire content of each of which is incorporated herein by reference.

BACKGROUND

1. Field

Embodiments of the present disclosure relate to a window film and a flexible display including the same.

2. Description of the Related Art

A window film is disposed at an outermost side of an optical display. Thus, the window film should have good transparency and high pencil hardness. Such window films may be mounted on various components of a display via adhesive layers. In the structure wherein the window film is mounted on the adhesive layer, the window film can suffer from deterioration in pencil hardness. The window film includes a base layer and a coating layer formed from a curable resin. The window film can have a high yellow index depending upon the base layer and/or the curable resin so that the window film can appear yellow. As a result, a display screen can provide poor image quality. The window film can be treated on a roll. If the window film has high sheet resistance and is likely to generate static electricity, there is a problem of difficulty of processing a roll. If antistatic treatment of the base layer of the window film is difficult, this problem can become more severe.

Recently, a flexible display having high flexibility to be folded and unfolded has been developed by replacing a glass substrate or a high hardness substrate of a display with a flexible film. In the flexible display, not only a substrate but also various components should have flexibility. A window film for flexible displays should also have good flexibility. A window film having low radii of curvature at opposite sides thereof to provide good flexibility can be advantageously used.

SUMMARY

In accordance with one aspect of an embodiment of the present disclosure, a window film includes a base layer, a window coating layer formed on one surface of the base layer, and a back coating layer formed on the other surface of the base layer, wherein the window coating layer is formed from a composition for window coating layer comprising a silicon-based resin, and the window film has an elastic modulus of about 1,000 Mpa or more on the back coating layer and has a pencil hardness of about 6H or higher on an adhesive layer.

In accordance with one aspect of an embodiment of the present disclosure, a flexible display includes the window film as set forth above.

BRIEF DESCRIPTION OF DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
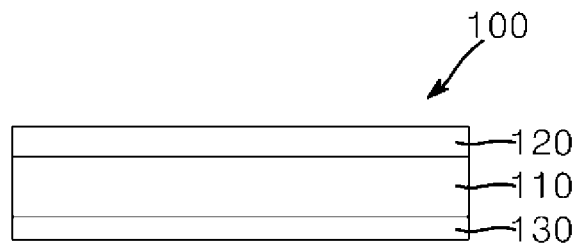
FIG. 1 is a cross-sectional view of a window film according to one embodiment of the present disclosure.

Embodiments of the present disclosure will be described in more detail with reference to the accompanying drawings. It should be understood that the present disclosure is not limited to the following embodiments and may be embodied in different ways. In the drawings, portions not necessary to the description will be omitted for clarity. Like components will be denoted by like reference numerals throughout the present disclosure.

As used herein, spatially relative terms such as "upper" and "lower" are defined with reference to the accompanying drawings. Thus, it will be understood that the term "upper surface" can be used interchangeably with the term "lower surface". In addition, when an element such as a layer or a film is referred to as being placed "on" another element, it can be directly on (or placed on) the other element, or intervening element(s) may be present. On the other hand, when an element is referred to as being placed "directly on" another element, there are no intervening element(s) therebetween.

As used herein, the term "UV curable group" refers to an epoxy group; a (meth)acrylate group; a (meth)acrylamide group; a vinyl group; an alicyclic epoxy group; a glycidoxy group; an oxetane group; or a $C_1$ to $C_6$ alkyl group or $C_5$ to $C_{10}$ cycloalkyl group having an epoxy group, a (meth)acrylate group, a (meth)acrylamide group, a vinyl group, an alicyclic epoxy group, a glycidoxy group or an oxetane group.

Unless otherwise stated, the term "substituted" means that at least one hydrogen atom of a functional group is substituted with a hydroxyl group, an unsubstituted $C_1$ to $C_{10}$ alkyl group, a $C_1$ to $C_{10}$ alkoxy group, a $C_3$ to $C_{10}$ cycloalkyl group, a $C_6$ to $C_{20}$ aryl group, a $C_7$ to $C_{20}$ arylalkyl group, a benzophenone group, a $C_6$ to $C_{20}$ aryl group substituted with a $C_1$ to $C_{10}$ alkyl group, or a $C_1$ to $C_{10}$ alkyl group substituted with a $C_1$ to $C_{10}$ alkoxy group.

As used herein, the term "(meth)acryl" refers to "acryl" and/or "methacryl".

As used herein, the prefix "Ec" refers to a (3,4-epoxycyclohexyl)ethyl group, the prefix "Me" refers to a methyl group, the prefix "Et" refers to an ethyl group, the prefix "Gp" refers to a 3-glycidoxypropyl group, and the prefix "Op" refers to a 3-oxetanylpropyl group.

As used herein, the term "pencil hardness on an adhesive layer" refers to a value measured on a window coating layer of a window film using a pencil hardness meter (Heidon) in accordance with JIS K5400, in which the window film is disposed on an adhesive layer (thickness: 50 μm) formed on a substrate (for example, glass substrate) such that the window coating layer is placed at an outermost side. In measuring the pencil hardness, pencils of 6B to 9H (Mitsubishi Co., Ltd.) were used. According to embodiments of the present disclosure, pencil hardness is measured under conditions of a pencil load of 1 kg on the window coating layer, a scratch angle (angle between a pencil and the window coating layer) of 45°, a scratch speed of 60 mm/min, a pencil pressing force of 19.6 N, and a pencil scale of 10.0 mm. When the window coating layer has one or more scratches after being tested 5 times using a certain pencil, pencil hardness is measured again using another pencil having one-level lower pencil hardness than the previous pencil, and the maximum value of pencil hardness allowing no scratch to be observed all five times on the window coating layer is taken as pencil hardness of the window coating layer after pencil hardness is repeatedly measured five times. In measuring the "pencil hardness on an adhesive layer", the "adhesive layer" may be an adhesive layer having a storage modulus of 10 kPa to 50 kPa at 25° C. and a glass transition temperature of −60° C. to −20° C. In order to prepare a specimen for measurement of storage modulus on the adhesive layer, a composition for adhesive layers is coated onto a release film and left at 35° C. and 45% RH for 24 hours to form a 50 μm thick adhesive film. After removing the release film from each of the adhesive films, 8 adhesive films were stacked and cut into a circular (e.g., substantially circular) specimen having a thickness of 400 μm and a diameter of 8 mm. Here, the storage modulus of the adhesive layer is measured at 25° C. under conditions of 1 rad/s with respect to the specimen on a disk having a diameter of 8 mm using a Physica MCR501 (Anton parr Co., Ltd.) while increasing temperature from −50° C. to 100° C.

As used herein, the term "pencil hardness" refers to a value measured on a window coating layer of a window film using a pencil hardness meter (Heidon) in accordance with JIS K5400, in which the window film is disposed on a substrate (for example, a glass substrate) such that the window coating layer is placed at an outermost side. In measuring the pencil hardness, pencils (Mitsubishi Co., Ltd.) of 6B to 9H were used. According to embodiments of the present disclosure, pencil hardness is measured under conditions of a pencil load of 1 kg on the window coating layer, a scratch angle (angle between a pencil and the window coating layer) of 45°, a scratch speed of 60 mm/min, a pencil compression force of 19.6 N, and a pencil scale of 10.0 mm. When the coating layer has one or more scratches after being tested 5 times using a certain pencil, pencil hardness is measured again using another pencil having one-level lower hardness than the previous pencil, and the maximum value of pencil hardness allowing no scratch to be observed all five times on the window coating layer is taken as pencil hardness of the window coating layer after pencil hardness is repeatedly measured five times.

As used herein, the terms "elastic modulus of window film" and "Martens hardness of window film" refer to values measured on a specimen, which can be prepared by forming an adhesive layer (thickness: 50 μm) on a glass substrate and stacking a window film on the adhesive layer, by applying a constant force of 200 mN to an outermost layer of the specimen at 25° C. for 20 seconds using a micro indenter (Vickers indenter), followed by creeping for 5 seconds and relaxation for 20 seconds. Here, the adhesive layer is the same as the adhesive layer used in measurement of pencil hardness. When the outermost layer of the specimen is a window coating layer, the values are referred to as 'elastic modulus on the window coating layer' and 'Martens hardness on the window coating layer'. When the outermost layer of the specimen is a back coating layer, the values are referred to as 'elastic modulus on the back coating layer' and 'Martens hardness on the back coating layer'. When the outermost layer of the specimen is a base layer, the values are referred to as 'elastic modulus on the base layer' and 'Martens hardness on the base layer'.

As used herein, the term "radius of curvature" refers to a minimum radius of a jig causing no crack (or no observable cracks) on a window film specimen when the window film specimen is wound around the jig for testing a radius of curvature (Mandela flexing tester, Coretech Co., Ltd.), kept wound for 5 seconds or more, unwound, and then observed with the naked eye to determine whether the specimen has cracks. Here, a radius of curvature in a compressive direction is measured when the specimen is wound around the jig such that a window coating layer of the window film contacts a surface of the jig, and a radius of curvature in a tensile direction is measured when the specimen is wound around the jig such that a base layer of the window film contacts the jig.

As used herein, the term "yellow index" of a window film refers to a value of yellow index 1925[Recal] with respect to the window film under a D65 light source at 2° (angle between the window coating layer and the light source) using a colorimeter (CM-3600d, Konica Minolta Co., Ltd.). As used herein, the term "yellow index" of the base layer refers to a value of the base layer measured by the same method as the method of measuring the yellow index of the window film.

As used herein, the term "b* value" refers to a value measured with respect to a window film under a D65 light source at 2° (angle between the window coating layer and the light source) using a colorimeter (CM-3600d, Konica Minolta Co., Ltd.).

Next, a window film according to one embodiment of the present disclosure will be described with reference to FIG. 1. FIG. 1 is a cross-sectional view of a window film according to one embodiment of the present disclosure.

Referring to FIG. 1, a window film 100 according to one embodiment may include a base layer 110, a window coating layer 120, and a back coating layer 130. The window film 100 includes the back coating layer 130, thereby exhibiting high pencil hardness on an adhesive layer.

The base layer 110 supports the window film 100 while improving mechanical strength of the window film 100.

The base layer 110 may be formed of a non-flexible film, or may be formed of a flexible film to improve flexibility of the window film 100. The base layer 110 may be formed from an optically transparent resin. For example, the optically transparent resin may include at least one selected from polyester resins including polyethylene terephthalate, polyethylene naphthalate, polybutylene terephthalate, and polybutylene naphthalate, polycarbonate resins, poly(meth)acrylate resins including poly(methyl methacrylate), polystyrene resins, polyamide resins, and polyimide resins. In some embodiments, a polyimide resin is used. The base layer 110 may have a thickness of about 10 μm to about 150 μm, for example, about 30 μm to about 100 μm, or about 40 μm to about 80 μm. Within this thickness range, the base layer 100 can be used in the window film.

The window coating layer 120 is formed on one surface of the base layer 110 to secure optical properties of the window film 100, such as transmittance (e.g., light transmittance) and haze, while improving pencil hardness of the window film 100. Furthermore, the window coating layer 120 has good flexibility to allow the window film 100 to be used not only in a non-flexible display, but also in a flexible display. The window coating layer 120 may be directly formed on the base layer 110. As used herein, the expression "directly formed on" indicates that no intervening layer such as an adhesive layer is interposed between the window coating layer 120 and the base layer 110. The window coating layer 120 may have a thickness of about 5 μm to about 150 μm, for example, about 20 μm to about 100 μm, about 20 μm to about 80 μm, about 30 μm to about 80 μm, or about 30 μm to about 50 μm. Within this thickness range, the window film can exhibit good flexibility and has high pencil hardness on an adhesive layer.

The window film 100 may have an elastic modulus of about 2,000 Mpa to about 4,000 Mpa on the window coating layer 120, and a Martens hardness of about 150 N/mm to about 300 N/mm on the window coating layer 120. Within these ranges, the window film has high pencil hardness on an adhesive layer and can exhibit good flexibility.

The window coating layer 120 may be formed from a composition for window coating layers, which contains a silicon-based resin. Thus, the composition for window coating layers can realize a window film having high pencil hardness and good flexibility. The composition for window coating layers may include a silicon-based resin, a curable monomer, and an initiator.

Next, embodiments of the composition for window coating layers will be described in more detail.

The silicon-based resin can form a matrix of the window coating layer 120 and can improve flexibility and pencil hardness of the window film 100. The silicon-based resin may include a siloxane resin having a UV curable group.

In one embodiment, the siloxane resin having a UV curable group may be prepared through hydrolysis and condensation of an organosilane having a UV curable group and an alkoxysilane group. For example, the organosilane having a UV curable group and an alkoxysilane group may be represented by Formula 1, without being limited thereto:

Formula 1 wherein $R^1$ is an epoxy group; a (meth)acrylate group; a (meth)acrylamide group; a vinyl group; a $C_1$ to $C_6$ alkyl group having an alicyclic epoxy group; a $C_1$ to $C_6$ alkyl group having a (meth)acrylate group; a $C_1$ to $C_6$ alkyl group having a (meth)acrylamide group; or a $C_1$ to $C_6$ alkyl group having a vinyl group; $R^2$ is a $C_1$ to $C_{10}$ alkyl group; $R^3$ is a $C_1$ to $C_{10}$ alkyl group, a $C_3$ to $C_{20}$ cycloalkyl group, a $C_6$ to $C_{20}$ aryl group, or a $C_7$ to $C_{20}$ arylalkyl group; $R^4$ is a single bond or a $C_1$ to $C_{10}$ alkylene group; and m is an integer of 1 to 3. With respect to Formula 1, the term "alicyclic epoxy group" refers to an epoxylated $C_3$ to $C_6$ cycloalkyl group or a $C_1$ to $C_{10}$ alkyl group having an epoxylated $C_3$ to $C_6$ cycloalkyl group. With respect to Formula 1, the term "single bond" means that $R^1$ and Si are directly bonded to each other without $R^4$ in Formula 1.

In some embodiments, the organosilane having a UV curable group and an alkoxysilane group may include at least one selected from 2-(3,4-epoxycyclohexyl)ethyltrimethoxysilane, 2-(3,4-epoxycyclohexyl)ethyltriethoxysilane, (meth)acryloxypropyltrimethoxysilane, (meth)acryloxypropyltriethoxysilane, and vinyltrimethoxysilane, without being limited thereto.

Hydrolysis and condensation may be carried out using any suitable process available in the art. In some embodiments, hydrolysis and condensation may be performed by mixing the organosilane having a UV curable group and an alkoxysilane group with a solvent. Hydrolysis and condensation may be performed for about 12 hours to about 7 days at room temperature, and may be performed for about 2 hours to about 72 hours at about 60° C. to about 100° C. for acceleration of reaction, without being limited thereto. The solvent is not particularly limited. For example, the solvent may include at least one selected from water, methanol, ethanol, n-propanol, isopropanol, n-butanol, t-butanol, and methoxypropanol. Reaction rate for hydrolysis and condensation may be controlled by adding a catalyst. The catalyst may include acid catalysts such as hydrochloric acid, acetic acid, hydrogen fluoride, nitric acid, sulfuric acid, chlorosulfonic acid, and iodic acid; base catalyst such as ammonia, potassium hydroxide, sodium hydroxide, barium hydroxide, and imidazole; ion exchange resins such as Amberite IRA-400, IRA-67, and/or the like.

The siloxane resin having a UV curable group may be prepared through hydrolysis and condensation of a mixture of the organosilane having a UV curable group and an alkoxysilane group and an organosilane having a different alkoxysilane group. The organosilane having a different alkoxysilane group may include an organosilane that does not contain a UV curable group. For example, the organosilane having a different alkoxysilane group may be represented by Formula 2:

Formula 2

(wherein $R^5$ is a $C_1$ to $C_{10}$ alkyl group; $R^6$ is an unsubstituted $C_1$ to $C_{20}$ alkyl group, a $C_3$ to $C_8$ cycloalkyl group, a $C_3$ to $C_{20}$ alkenyl group, a $C_2$ to $C_{20}$ alkynyl group, a $C_6$ to $C_{20}$ aryl group, a halogen, a $C_1$ to $C_{10}$ alkyl group having a halogen, an amino group, a $C_1$ to $C_{10}$ alkyl group having an amino group, a mercapto group, a $C_1$ to $C_{10}$ ether group, a carbonyl group, a carboxylate group, or a nitro group; and n is an integer of 1 to 4).

With respect to Formula 2, the term "halogen" refers to fluorine, chlorine, iodine or bromine. For example, the organosilane compound of Formula 2 may include at least one selected from among tetramethoxysilane, tetraethoxysilane, methyltrimethoxysilane, methyltriethoxysilane, methyltripropoxysilane, dimethyldimethoxysilane, dimethyldiethoxysilane, phenyltrimethoxysilane, diphenyldimethoxysilane, diphenyldiethoxysilane, triphenylmethoxysilane, triphenylethoxysilane, ethyltriethoxysilane, propylethyltrimethoxysilane, 3-aminopropyltrimethoxysilane, 3-aminopropyltriethoxysilane, chloropropyltrimethoxysilane, and chloropropyltriethoxysilane.

In another embodiment, the siloxane resin having a UV curable group may include a siloxane resin represented by Formula 3:

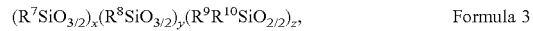

Formula 3 wherein $R^7$ and $R^8$ are each independently a UV curable group and different from each other; $R^9$ and $R^{10}$ are each independently hydrogen, a UV curable group, a substituted or unsubstituted $C_1$ to $C_{20}$ alkyl group, or a substituted or unsubstituted $C_5$ to $C_{20}$ cycloalkyl group; and $0<x\leq1$, $0\leq y<1$, $0\leq z<1$, $x+y+z=1$.

$R^7$ and $R^8$ provide crosslinking properties, and are each independently a $C_1$ to $C_6$ alkyl group or $C_5$ to $C_{10}$ cycloalkyl group having an alicyclic epoxy group, a glycidoxy group or an oxetane group, for example, a ((3,4-epoxycyclohexyl)

methyl) group, a ((3,4-epoxycyclohexyl)ethyl) group, a ((3,4-epoxycyclohexyl)propyl) group, a (3-glycidoxypropyl) group, a (3-oxetanylmethyl) group, a (3-oxetanylethyl) group, or a (3-oxetanylpropyl) group. $R^9$ and $R^{10}$ further provide crosslinking properties and flexibility to the window coating layer 120, and are each independently a $C_1$ to $C_6$ alkyl group or a $C_5$ to $C_{10}$ cycloalkyl group each having an alicyclic epoxy group, a glycidoxy group or an oxetane group; a substituted or unsubstituted $C_1$ to $C_{10}$ alkyl group, for example, a (3,4-epoxycyclohexyl)methyl group, a (3,4-epoxycyclohexyl)ethyl group, a (3,4-epoxycyclohexyl)propyl group, a glycidoxypropyl group, a methyl group, or an ethyl group.

In one embodiment, the siloxane resin having a UV curable group may include a siloxane resin represented by any one or Formula 3-1 to Formula 3-3:

$$R^7SiO_{3/2} \quad \text{Formula 3-1}$$

$$(R^7SiO_{3/2})_x(R^8SiO_{3/2})_y \quad \text{Formula 3-2}$$

$$(R^7SiO_{3/2})_x(R^9R^{10}SiO_{2/2})_z \quad \text{Formula 3-3}$$

In Formula 3-1 to Formula 3-3, $R^7$, $R^8$, $R^9$ and $R^{10}$ are the same as defined in Formula 3, and $0<x<1$, $0<y<1$, $0<z<1$, $x+y=1$, and $x+z=1$. For example, x may be in a range of about 0.20 to about 0.999; y may be in a range of about 0.001 to about 0.80; z may be in a range of about 0.001 to about 0.80. In some embodiments, x may be in a range of about 0.20 to about 0.99; y may be in a range of about 0.01 to about 0.80; and z may be in a range of about 0.01 to about 0.80, for example, x may be in a range of about 0.50 to about 0.99; y may be in a range of about 0.01 to about 0.50; and z may be in a range of about 0.01 to about 0.50, or x may be in a range of about 0.90 to about 0.97; y may be in a range of about 0.03 to about 0.10; and z may be in a range of about 0.03 to about 0.10. Within these ranges, the window film can have high pencil hardness and good flexibility. For example, the siloxane resin may include at least one selected from a siloxane resin composed of T units represented by $EcSiO_{3/2}$ and a siloxane resin composed of T units represented by $GpSiO_{3/2}$. Further, the siloxane resin may be a siloxane resin including a compound represented by $(EcSiO_{3/2})_x(GpSiO_{3/2})_y$, $(0<x<1, 0<y<1, x+y=1)$. In addition, the siloxane resin may include any one of compounds represented by Formula 3-3A to Formula 3-3L, respectively, without being limited thereto:

$$(EcSiO_{3/2})_x((Me)_2SiO_{2/2})_z \quad \text{Formula 3-3A}$$

$$(EcSiO_{3/2})_x(MeEtSiO_{2/2})_z \quad \text{Formula 3-3B}$$

$$(GpSiO_{3/2})_x((Me)_2SiO_{2/2})_z \quad \text{Formula 3-3C}$$

$$(GpSiO_{3/2})_x(MeEtSiO_{2/2})_z \quad \text{Formula 3-3D}$$

$$(OpSiO_{3/2})_x((Me)_2SiO_{2/2})_z \quad \text{Formula 3-3E}$$

$$(OpSiO_{3/2})_x(MeEtSiO_{2/2})_z \quad \text{Formula 3-3F}$$

$$(EcSiO_{3/2})_x(EcMeSiO_{2/2})_z \quad \text{Formula 3-3G}$$

$$(EcSiO_{3/2})_x(GpMeSiO_{2/2})_z \quad \text{Formula 3-3H}$$

$$(GpSiO_{3/2})_x(EcMeSiO_{2/2})_z \quad \text{Formula 3-3I}$$

$$(GpSiO_{312})_x(GpMeSiO_{2/2})_z \quad \text{Formula 3-3J}$$

$$(OpSiO_{3/2})_x(EcMeSiO_{2/2})_z \quad \text{Formula 3-3K}$$

$$(OpSiO_{3/2})_x(GpMeSiO_{2/2})_z \quad \text{Formula 3-3L}$$

(wherein $0<x<1$, $0<z<1$, and $x+z=1$).

In some embodiments, x may be in a range of about 0.20 to about 0.999 and z may be in a range of about 0.001 to about 0.80, for example, x may be in a range of about 0.20 to about 0.99 and z may be in a range of about 0.01 to about 0.80; x may be in a range of about 0.50 to about 0.99 and z may be in a range of about 0.01 to about 0.50; or x may be in a range of about 0.90 to about 0.97 and z may be in a range of about 0.03 to about 0.10.

The siloxane resin having a UV curable group may have a weight average molecular weight of about 1,000 g/mol to about 15,000 g/mol. The siloxane resin having a UV curable group may have a polydispersity index (PDI) of about 1.0 to about 3.0. Within these ranges of weight average molecular weight and polydispersity index, the composition can improve pencil hardness and transparency of the window film through dense crosslinking of the siloxane resin.

The siloxane resin having a UV curable group represented by Formula 3 may be prepared through hydrolysis and condensation of an alkoxysilane alone providing $R^7SiO_{3/2}$ or a monomer mixture including at least one selected from an alkoxysilane alone providing $R^7SiO_{3/2}$, an alkoxysilane providing $R^8SiO_{3/2}$, and an alkoxysilane providing $R^9R^{10}SiO_{2/2}$. Hydrolysis and condensation may be carried out according to any suitable process available in the art. In some embodiments, hydrolysis and condensation may be performed for about 12 hours to about 7 days at room temperature, and may be performed for about 2 hours to about 72 hours at about 60° C. to about 100° C. for acceleration of reaction, without being limited thereto. The solvent is not particularly limited. For example, the solvent may include at least one selected from water, methanol, ethanol, n-propanol, isopropanol, n-butanol, t-butanol, and methoxypropanol. Reaction rate for hydrolysis and condensation may be controlled by adding a catalyst. The catalyst may include acid catalysts such as hydrochloric acid, acetic acid, hydrogen fluoride, nitric acid, sulfuric acid, chlorosulfonic acid, and iodic acid; base catalyst such as ammonia, potassium hydroxide, sodium hydroxide, barium hydroxide, and imidazole; ion exchange resins such as Amberite IRA-400, IRA-67, and the like.

The curable monomer is crosslinked with the silicon-based resin to increase pencil hardness of the window film while controlling viscosity of the composition for window coating layers to improve processability. The curable monomer may include at least one selected from an epoxy group-containing monomer, an acid anhydride group-containing monomer, and an oxetane group-containing monomer. The epoxy group-containing monomer may include a photocurable monomer including at least one epoxy group. The epoxy group may include an epoxy group and an organic group including an epoxy group, for example, a glycidyl group. The epoxy monomer may include an alicyclic epoxy monomer, an aromatic epoxy monomer, an aliphatic epoxy monomer, a hydrogenated epoxy monomer, or a mixture thereof. The alicyclic epoxy monomer is a monomer having one or more epoxy groups in a $C_3$ to $C_{10}$ alicyclic ring, for example, 3,4-epoxycyclohexylmethyl-3',4'-epoxycyclohexane carboxylate, without being limited thereto. The aromatic epoxy monomer may include bisphenol A, bisphenol F, phenol novolac, cresol novolac, glycidyl ether of triphenylmethane, tetraglycidyl methyleneaniline, and the like. The aliphatic epoxy monomer may include 1,4-butanediol glycidyl ether, 1,6-hexanediol diglycidyl ether, and the like, and the hydrogenated epoxy monomer is obtained through hydrogenation of an aromatic epoxy monomer and may include hydrogenated bisphenol A diglycidyl ether. The acid anhydride group-containing monomer may include at least one selected from phthalic anhydride, tetrahydrophthalic anhydride, hexahydrophthalic anhydride, methylnadic anhydride, chlorendic anhydride, and pyromellitic anhydride. The oxetane group-containing monomer may include at least one selected from 3-methyloxetane, 2-methyloxetane, 3-oxetanol, 2-methyleneoxetane, 3,3-oxetanemethanethiol, 4-(3-methyloxetane-3-yl)benzonitrile, N-(2,2-dimethylpropyl)3-methyl-3-oxetaneamine, N-(1,2-dimethylbutyl)-3-methyl-3-oxetaneamine, (3-ethyloxetane-3-yl)methylmethacrylate, 3-ethyl-3-hydroxymethyl-oxetane, 2-ethyloxetane, xylenebisoxetane, and 3-ethyl-3-[[(3-ethyloxetane-3-yl)methoxy]methyl]oxetane.

The initiator can cure the silicon-based resin and the curable monomer to form a window coating layer. The initiator may include at least one selected from a photocationic initiator, a cationic thermal initiator, and a photoradical initiator.

The photocationic initiator accelerates curing by generating cations upon irradiation with light and may include any suitable photocationic initiator available in the art. The photocationic initiator may include salts of a cation and an anion. Examples of cations may include diaryliodonium such as diphenyliodonium, 4-methoxydiphenyliodonium, bis(4-methylphenyl)iodonium, (4-methylphenyl)[4-(2-methylpropyl)phenyl]iodonium, bis(4-tert-butylphenyl)iodonium, bis(dodecylphenyl)iodonium, and the like; triarylsulfonium such as triphenylsulfonium and diphenyl-3-thiophenoxyphenylsulfonium; bis[4-(diphenylsulfonio) phenyl]sulfide; bis[4-(di(4-(2-hydroxyethyl)phenyl) sulfonio)-phenyl]sulfide; (n5-2,4-cyclopentadien-1-yl)[(1,2, 3,4,5,6-η)-(1-methylethyl)benzene]iron(1+), and the like. Examples of anions may include tetrafluoroborate ($BF_4^-$), hexafluoroborate ($PF_6^-$), hexafluoroantimonate ($SbF_6^-$), hexafluoroarsenate ($AsF_6^-$), hexachloroantimonate ($SbCl_6^-$), and the like.

The cationic thermal initiator may include 3-methyl-2-butenyltetramethylenesulfonium, ytterbium, samarium, erbium, dysprosium, lanthanum, tetrabutylphosphonium, ethyltriphenylphosphonium bromide salt, benzyldimethylamine, dimethylaminomethylphenol, triethanolamine, N-n-butylimidazole, 2-ethyl-4-methylimidazole, and the like. Examples of the anion may include tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$), and the like.

The photoradical initiator accelerates curing by generating radicals upon irradiation with light, and may include any suitable photoradical initiators available in the art. In some embodiments, the photoradical initiator may include at least one selected from phosphorus, triazine, acetophenone, benzophenone, thioxanthone, benzoin, and oxime photoradical initiators.

The composition for window coating layers may have a viscosity at 25° C. of about 1 cP to about 3,000 cP. Within this range, the composition for window coating layers can exhibit good coatability and wettability, thereby facilitating formation of the window coating layer.

The composition for window coating layers may include about 65 wt % to about 95 wt % of the silicon-based resin, about 4 wt % to about 30 wt % of the curable monomer, and about 0.1 wt % to about 10 wt % of the initiator, based on the total weight of the composition for window coating layers. Within this content range, the composition can improve flexibility and pencil hardness of the window coating layer. As used herein, the expression "in terms of solid content" refers to being based on the remainder of the composition excluding the solvent.

The composition for window coating layers may include 100 parts by weight of the silicon-based resin, about 1 part by weight to about 20 parts by weight of the curable monomer, for example, about 1 part by weight to about 15 parts by weight, and about 0.1 parts by weight to about 20 parts by weight, or about 0.5 parts by weight to about 10 parts by weight of the initiator, in terms of solid content. Within this content range, the composition can improve flexibility and pencil hardness of the window coating layer.

The composition for window coating layers may further include any suitable additive available in the art. In some embodiments, the additive may include at least one selected from antistatic agents, leveling agents, antioxidants, stabilizers, and colorants.

The composition for window coating layers may further include a solvent such as methylethylketone.

The composition for window coating layers may further include nanoparticles. The nanoparticles can increase elastic modulus on the window coating layer and Martens hardness on the window coating layer. The nanoparticles may include at least one selected from silica, aluminum oxide, zirconium oxide, and titanium oxide, without being limited thereto. The nanoparticles may be surface-treated with a silicone compound. The nanoparticles may have any suitable shape and size without limitation. For example, the nanoparticles may include particles having circular (e.g., substantially circular), flake, amorphous shapes, and the like. The nanoparticles may have an average particle diameter of about 1 nm to about 200 nm, for example, about 5 nm to about 50 nm, or about 10 nm to about 30 nm. Within this range, the nanoparticles can improve hardness of the window film without (e.g., substantially without) adverse effects on surface roughness and transparency of the window film. The nanoparticles may be present in an amount of about 0.1 parts by weight to about 100 parts by weight, for example, about 1 part by weight to about 80 parts by weight, based on 100 parts by weight of the silicon-based resin. Within this range, the nanoparticles can increase pencil harness of the window film on an adhesive layer while reducing surface roughness of the window coating layer.

As used herein, the expression "in terms of solid content" refers to being based on the remainder of the composition excluding the solvent.

The back coating layer 130 is formed on the other surface of the base layer 110 and can improve pencil hardness of the window film on an adhesive layer. FIG. 1 shows a structure wherein the base layer 110 is directly formed on the back coating layer 130. As used herein, the expression "directly formed on" indicates that no intervening layer such as an adhesive layer is interposed between the base layer 110 and the back coating layer 130.

The back coating layer 130 may have a thickness of about 1 μm to about 100 μm, for example, about 2 μm to about 50 μm, or about 2 μm to about 20 μm. Within this thickness range, the back coating layer can be used in the window film and exhibit good flexibility, and the window film can have high pencil hardness on an adhesive layer.

The window film 100 may have an elastic modulus on the back coating layer 130 of about 1,000 Mpa or more, for example, about 1,000 Mpa to about 2,000 Mpa. The window film 100 may have Martens hardness on the back coating layer 130 of about 50 N/mm to about 200 N/mm. Within these ranges, the window film has high pencil hardness on an adhesive layer and can exhibit good flexibility.

The back coating layer 130 may be formed from a composition for back coating layers including a UV curable group-containing resin, a crosslinking agent, and an initiator. Next, the composition for back coating layers will be described.

The UV curable group-containing resin can be cured together with the crosslinking agent to form a matrix of the back coating layer 130. For example, the UV curable group-containing resin may include at least one selected from a (meth)acrylic resin having UV curable group and a siloxane resin having a UV curable group.

The (meth)acrylic resin having UV curable group may include a monofunctional to hexafunctional (meth)acrylic resin. The (meth)acrylic resin having UV curable group may include a copolymer of a mixture including at least one selected from an alkyl group-containing (meth)acrylic ester, a hydroxyl group-containing (meth)acrylic ester, a carboxylic acid group-containing (meth)acrylic monomer, an alicyclic group-containing (meth)acrylic ester, a hetero-alicyclic group-containing (meth)acrylic ester, and an aromatic group-containing (meth)acrylic ester. For example, the alkyl group-containing (meth)acrylic ester may be an unsubstituted $C_1$ to $C_{10}$ alkyl group-containing (meth)acrylic ester. The hydroxyl group-containing (meth)acrylic ester may be a (meth)acrylic ester containing a $C_1$ to $C_{10}$ alkyl group-containing having at least one hydroxyl group. The carboxylic acid group-containing (meth)acrylic monomer may be (meth)acrylic acid. The alicyclic group-containing (meth)acrylic ester may be a $C_5$ to $C_{10}$ alicyclic group-containing (meth)acrylic ester. The hetero-alicyclic group-containing (meth)acrylic ester may be a $C_3$ to $C_{10}$ hetero-alicyclic group-containing (meth)acrylic ester containing nitrogen, oxygen or sulfur. The aromatic group-containing (meth)acrylic ester may be a $C_6$ to $C_{20}$ aryl group or a $C_7$ to $C_{20}$ arylalkyl group-containing (meth)acrylic ester.

The (meth)acrylic resin having UV curable group may include a di- or higher functional, for example difunctional to hexafunctional, urethane (meth)acrylic resin. The urethane (meth)acrylic resin may be prepared through any suitable urethane synthesis reaction of at least one polyol, at least one polyisocyanate compound, and a (meth)acrylate containing at least one hydroxyl group. The polyol may include at least one selected from an aromatic polyether polyol, an aliphatic polyether polyol, an alicyclic polyether polyol, a polyester polyol, a polycarbonate polyol, and a polycaprolactone polyol. The polyisocyanate compound is a compound containing two or more isocyanate groups, and may include toluene diisocyanate, xylene diisocyanate, naphthalene diisocyanate, phenylene diisocyanate, diphenylmethane diisocyanate, biphenylene diisocyanate, hexane diisocyanate, isophorone diisocyanate, or adducts thereof. The (meth)acrylate containing at least one hydroxyl group is a $C_1$ to $C_{10}$ (meth)acrylic ester having at least one hydroxyl group, and, for example, may include 2-hydroxyethyl (meth)acrylate, or 1,4-butanediol (meth)acrylate. For example, the urethane (meth)acrylic resin may include a hexafunctional aliphatic urethane (meth)acrylate resin.

The siloxane resin having a UV curable group may include a siloxane resin represented by Formula 3.

The UV curable group-containing resin may have a weight average molecular weight of about 500 g/mol to about 8,000 g/mol, for example, about 1,000 g/mol to about 5,000 g/mol. Within this range, the window film can have high pencil hardness and good flexibility.

The crosslinking agent can be cured together with the UV curable group-containing resin to form a matrix of the back coating layer while increasing pencil harness of the window film on the back coating layer. For example, the crosslinking agent may include at least one selected from a di- to hexafunctional (meth)acrylic monomer, the aforementioned epoxy monomer, the aforementioned acid anhydride monomer, and the aforementioned oxetane monomer. The di- to hexafunctional (meth)acrylic monomer may include at least one selected from among bifunctional (meth)acrylates such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, dicyclopentenyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic di(meth)acrylate, tricyclodecane dimethanol (meth)acrylate, neopentyl glycol-modified trimethylpropane di(meth)acrylate, adamantane di(meth)acrylate, and 9,9-bis [4-(2-acryloyloxyethoxy)phenyl] fluorine; trifunctional acrylates such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri (meth)acrylate, trifunctional urethane (meth)acrylates, tris (meth)acryloxyethylisocyanurate, and trifunctional (meth) acrylate alkoxylated with a $C_1$ to $C_5$ alkoxy group (for example: an ethoxy group, a propoxy group or a butoxy group), such as propoxylated glycerine tri(meth)acrylate and ethoxylated trimethylolpropane tri(meth)acrylate; tetrafunctional acrylates such as diglycerin tetra(meth)acrylate and pentaerythritol tetra(meth)acrylate; pentafunctional acrylates such as dipentaerythritol penta(meth)acrylate; and hexafunctional acrylates such as dipentaerythritol hexa(meth)acrylate, caprolactone-modified dipentaerythritol hexa (meth)acrylate, and urethane (meth)acrylates (for example, reaction products of an isocyanate monomer and trimethylolpropane tri(meth)acrylate).

The crosslinking agent may be present in an amount of about 1 part by weight to about 70 parts by weight, for example, about 5 parts by weight to about 65 parts by weight, about 5 parts by weight to about 50 parts by weight, about 10 parts by weight to about 60 parts by weight, or about 15 parts by weight to about 40 parts by weight, based on 100 parts by weight of the UV curable group-containing resin in terms of solid content. Within this range, the composition can increase pencil hardness of the window film on an adhesive layer.

The initiator serves to cure the UV curable group-containing resin and the crosslinking agent, and may include at least one selected from the photocationic initiator, the cationic thermal initiator, and the photoradical initiator described above.

The initiator may be present in an amount of about 0.1 parts by weight to about 10 parts by weight, for example, about 1 part by weight to about 10 parts by weight, or about 1 part by weight to about 7 parts by weight, based on 100 parts by weight of the UV curable group-containing resin in terms of solid content. Within this range, embodiments the composition for back coating layers can be sufficiently or suitably cured and can prevent or reduce deterioration of transparency of the window film due to remaining initiator.

The composition for back coating layers may further include nanoparticles. The nanoparticles can increase elastic modulus and Martens hardness of the back coating layer. In the composition for back coating layers, the nanoparticles may be present in an amount of about 0.1 parts by weight to about 100 parts by weight, for example, about 1 part by weight to about 80 parts by weight, based on 100 parts by weight of the UV curable group-containing resin in terms of solid content. Within this range, the composition for back coating layers can increase pencil hardness of the window film on an adhesive layer while reducing surface roughness of the back coating layer.

The composition for back coating layers may further include any suitable additive available in the art. In some embodiments, the additive may include at least one selected from dyes, UV absorbers, reaction inhibitors, adhesion promoters, thixotropic agents, conductivity imparting agents, color regulators, stabilizers, antistatic agents, antioxidants, and leveling agents, without being limited thereto.

Figure 2:
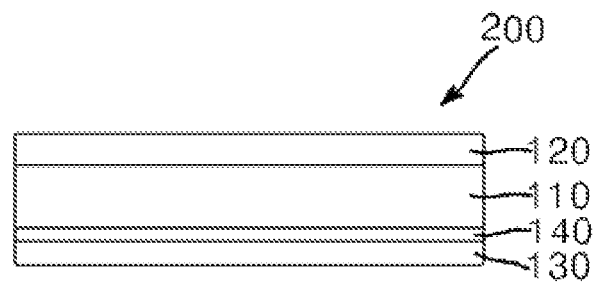
FIG. 2 is a cross-sectional view of a window film according to another embodiment of the present disclosure.

Next, a window film according to another embodiment of the present disclosure will be described with reference to FIG. 2. FIG. 2 is a cross-sectional view of a window film according to another embodiment of the present disclosure.

Referring to FIG. 2, a window film 200 according to this embodiment may include a base layer 110, a window coating layer 120, a back coating layer 130, and an adhesive layer 140. The window film 200 according to this embodiment is substantially the same as the window film 100 according to the above embodiment except that the window film further includes the adhesive layer 140. The adhesive layer 140 provides a further improved effect in coupling between the base layer 110 and the back coating layer 130. Hereinafter, embodiments of the adhesive layer 140 will be described in more detail.

The adhesive layer 140 is formed between the base layer 110 and the back coating layer 130 and can attach the base layer 110 and the back coating layer 130 to each other.

The adhesive layer 140 may have a thickness of about 10 μm to about 100 μm, for example, about 20 μm to about 80 μm, or about 30 μm to about 50 μm.

The adhesive layer 140 may be formed from a composition for adhesive layers, which includes a (meth)acrylic adhesive resin and a curing agent.

The (meth)acrylic adhesive resin may include a (meth)acrylic copolymer of a monomer mixture including at least one selected from an alkyl group-containing (meth)acrylic monomer, a hydroxyl group-containing (meth)acrylic monomer, an alicyclic group-containing (meth)acrylic monomer, a hetero-alicyclic group-containing (meth)acrylic monomer, and a carboxylate group-containing (meth)acrylic monomer.

The alkyl group-containing (meth)acrylic monomer may include an unsubstituted $C_1$ to $C_{10}$ alkyl group-containing (meth)acrylic ester. The hydroxyl group-containing (meth) acrylic monomer may include a (meth)acrylic ester containing a $C_1$ to $C_{10}$ alkyl group having at least one hydroxyl group. The alicyclic group-containing (meth)acrylic monomer may include a $C_3$ to $C_{10}$ alicyclic group-containing (meth)acrylic ester. The hetero-alicyclic group-containing (meth)acrylic monomer may include a $C_3$ to $C_{10}$ hetero-alicyclic group-containing (meth)acrylic ester containing nitrogen, oxygen or sulfur. The carboxylate group-containing (meth)acrylic monomer may include (meth)acrylic acid.

The curing agent may include at least one selected from an isocyanate curing agent, an epoxy curing agent, an imide curing agent, and a metal chelate curing agent. These curing agents may be used alone or in combination thereof. The curing agent may be present in an amount of about 0.1 parts by weight to about 10 parts by weight, for example, about 0.1 parts by weight to about 1 part by weight, based on 100 parts by weight of the (meth)acrylic adhesive resin in the composition for adhesive layers in terms of solid content.

The composition for adhesive layers may further include a silane coupling agent. The silane coupling agent can further improve adhesion of the composition for adhesive layers. As the silane coupling agent, any one or more of suitable silane coupling agents available in the art may be used. In some embodiments, the silane coupling agent may include at least one selected from the group consisting of epoxy structure-containing silicon compounds such as 3-glycidoxypropyltrimethoxysilane, 3-glycidoxypropylmethyldimethoxysilane, and 2-(3,4-epoxycyclohexyl)ethyltrimethoxysilane; polymerizable unsaturated group-containing silicon compounds such as vinyltrimethoxysilane, vinyltriethoxysilane, and (meth)acryloxypropyltrimethoxysilane; and amino group-containing silicon compounds such as 3-aminopropyltrimethoxysilane, 3-aminopropyltriethoxysilane, N-(2-aminoethyl)-3-aminopropyltrimethoxysilane, and N-(2-aminoethyl)-3-aminopropylmethyldimethoxysilane. The silane coupling agent may be optionally present in an amount of about 10 parts by weight or less, for example, about 1 part by weight or less, based on 100 parts by weight of the (meth)acrylic adhesive resin in the composition for adhesive layers in terms of solid content. Within this range, the silane coupling agent can exhibit good adhesive strength.

Figure 3:
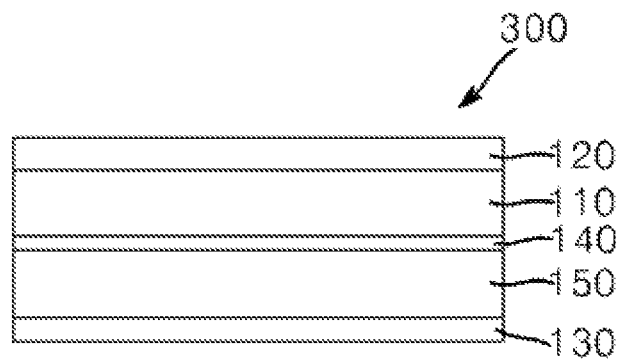
FIG. 3 is a cross-sectional view of a window film according to a further embodiment of the present disclosure.

Next, a window film according to a further embodiment of the present disclosure will be described with reference to FIG. 3. FIG. 3 is a cross-sectional view of a window film according to a further embodiment of the present disclosure.

Referring to FIG. 3, a window film 300 according to this embodiment may include a window coating layer 120, a base layer 110, an adhesive layer 140, a support layer 150, and a back coating layer 130. The window film 300 according to this embodiment is substantially the same as the window film 200 according to the above embodiment except that the support layer 150 is further formed between the adhesive layer 140 and the back coating layer 130. The support layer 150 improves pencil hardness of the window film on an adhesive layer. Hereinafter, embodiments of the support layer 150 will be described in more detail.

The support layer 150 is formed between the adhesive layer 140 and the back coating layer 130 to facilitate formation of the adhesive layer 140 and the back coating layer 130 of the window film 300 while improving pencil hardness of the window film 300 on an adhesive layer.

The support layer 150 may be formed from the same or different resin from that of the base layer 110. For example, the resin may include at least one selected from polyester resins including polyethylene terephthalate, polyethylene naphthalate, polybutylene terephthalate, and polybutylene naphthalate, polycarbonate resins, poly(meth)acrylate resins including poly(methyl methacrylate), polystyrene resins, polyamide resins, and polyimide resins. The support layer 150 may have a thickness of about 10 μm to about 200 μm, for example, about 20 μm to about 150 μm, or about 50 μm to about 100 μm.

Figure 4:
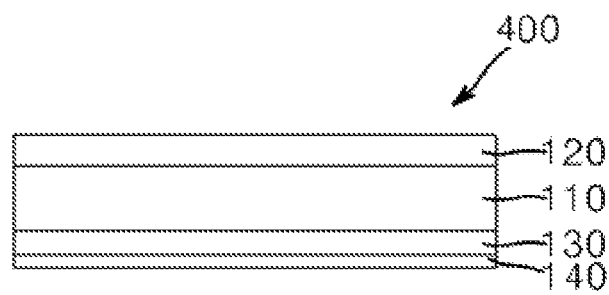
FIG. 4 is a cross-sectional view of a window film according to yet another embodiment of the present disclosure.

Next, a window film according to yet another embodiment of the present disclosure will be described with reference to FIG. 4. FIG. 4 is a cross-sectional view of a window film according to yet another embodiment of the present disclosure.

Referring to FIG. 4, a window film 400 according to this embodiment may include a window coating layer 120, a base layer 110, a back coating layer 130, and an adhesive layer 140. The window film 400 according to this embodiment is substantially the same as the window film 100 according to the above embodiment except that the adhesive layer 140 is further formed on a lower surface of the back coating layer 130. The adhesive layer 140 allows the window film 400 to be directly attached to an upper surface of an element of a display, for example, a polarizing plate, a conductive film, or an organic light emitting diode.

Figure 5:
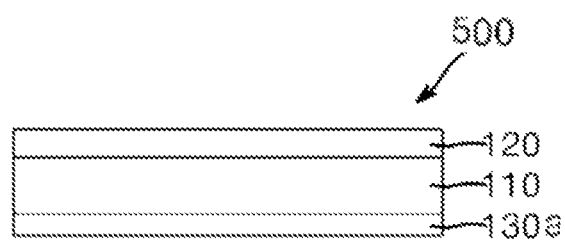
FIG. 5 is a cross-sectional view of a window film according to yet another embodiment of the present disclosure.

Next, a window film according to yet another embodiment of the present disclosure will be described with reference to FIG. 5. FIG. 5 is a cross-sectional view of a window film according to yet another embodiment of the present disclosure.

Referring to FIG. 5, a window film 500 according to this embodiment may include a window coating layer 120, a base layer 110, and a back coating layer 130a, which may include dyes. A window film including a base layer formed of a plastic material instead of glass and a window coating layer formed from a curable resin has a high yellow index and thus a yellow color of the window film can be viewed on a front surface and/or a side surface thereof. Conversely, the window film 500 according to this embodiment contains dyes to have a low yellow index and thus can prevent or reduce yellowing on the front surface and/or the side surface thereof. For example, the window film 500 may have a yellow index of about −2.5 to about 3.5, or about −1.5 to about 1.5. Within this range, when viewed on the front surface and/or the side surface thereof by the naked eye, the window film can prevent or reduce yellowing. In addition, the window film 500 according to this embodiment includes the dyes and thus has a b* value of about −2.5 to about 2.5, for example, about −1.5 to about 1.5, or about −0.5 to about 1.5. Within this range, when viewed on the front surface and/or the side surface thereof by the naked eye, the window film can prevent or reduce yellowing. Although FIG. 5 shows the structure wherein the dyes are included in the back coating layer 130a, the dyes may be included in at least one selected from the base layer, the window coating layer, and the back coating layer.

The dyes may be included in the back coating layer 130a. Thus, the window film 500 according to this embodiment has a low yellow index to exhibit good transparency and can prevent or reduce yellowing, without (e.g., substantially without) deterioration in optical properties of the base layer 110, the window coating layer 120, and the window film 500. Further, in the window film 500 according to this embodiment, the window coating layer 120 may be free from dyes to have a high crosslinking degree, thereby providing high pencil hardness.

The base layer 110 is the same as that of the window film 100 according to the above embodiment. In one embodiment, the base layer 110 may have a yellow index of about 1 to about 9. For example, if the base layer 110 of the window film 500 has a yellow index of about 3 or more, the yellow index of the window film 500 can be decreased due to the back coating layer 130a including the dyes. In one embodiment, the base layer may include a film formed from a polyimide resin. Thus, the base layer 110 has high thermal resistance, thereby improving thermal resistance of the window film 500. Although the base layer formed from a polyimide resin has a high yellow index of about 5 or more, the window film 500 according to this embodiment includes the dyes, thereby reducing the overall yellow index of the window film 500.

The window coating layer 120 is the same as that of the window film 100 described above.

The back coating layer 130a is formed on the other surface of the base layer 110 to support the window film 500. FIG. 5 shows the structure wherein the back coating layer 130a is directly formed on the base layer 110. As used herein, the expression "directly formed on" indicates that no intervening layer such as an adhesive layer is interposed between the base layer 110 and the back coating layer 130. The back coating layer 130a may include dyes. Since the back coating layer 130a includes the dyes, the yellow index of the window film 500 can be decreased to prevent the window film 500 from appearing yellow (or to reduce such yellowing), without (e.g., substantially without) deterioration in optical properties of the base layer 110, the window coating layer 120 and the window film 500.

The back coating layer 130a may have a thickness of about 5 μm or less, for example, about 300 nm or less, about 100 nm or less, or about 60 nm to about 80 nm, for example, about 10 nm to about 30 nm. Within this thickness range, the back coating layer 130a can be used in the window film and can exhibit good flexibility.

The back coating layer 130a may be formed from a composition for back coating layers, which includes a UV curable group-containing resin, a crosslinking agent, an initiator, and dyes. The UV curable group-containing resin, the crosslinking agent, and the initiator are the same as those of the window film according to the embodiment. Thus, the following description will be given of the dyes alone.

The dyes may be placed at a certain location of the back coating layer 130a. For example, the dyes may be distributed throughout the back coating layer 130a, or may be provided in the form of a single layer or a plurality of layers. The dyes may have a maximum absorption wavelength of about 500 nm to about 650 nm, for example, about 550 nm to about 620 nm. Within this range, the dyes can reduce the yellow index of the window film without (e.g., substantially without) deterioration in optical properties of the base layer, the window coating layer and the window film. As used herein, the term "maximum absorption wavelength" refers to a wavelength at a maximum absorption peak, that is, a wavelength indicating a maximum absorbance in an absorbance curve depending upon wavelength. The dyes may include at least one selected from metal dyes and non-metal dyes free from metal, which have a maximum absorption wavelength of about 500 nm to about 650 nm. The metal dyes may have a maximum absorption wavelength of about 500 nm to about 650 nm, for example about 550 nm to about 620 nm, and includes metal. In some embodiments, the metal dyes may include at least one selected from metal complexes of vanadium, chromium, and manganese, without being limited thereto. For example, the metal dyes may be a conjugated heterocyclic vanadium complex. The non-metal dyes may have a maximum absorption wavelength of about 500 nm to about 650 nm, for example, about 550 nm to about 620 nm, and do not include metal. In some embodiments, the non-metal dyes may include at least one selected from cyanine dyes, porphyrin dyes including tetraaza porphyrin, arylmethane dyes, squarylium dyes, azomethine dyes, oxonol dyes, azo dyes, arylidene dyes, xanthene dyes, and merocyanine dyes, without being limited thereto. In the composition for back coating layers, the dyes may be present in an amount of about 0.001 wt % to about 15 wt %, for example, about 0.01 wt % to about 5 wt %, or about 0.1 wt % to about 3 wt %, based on the total weight of the composition for back coating layers, in terms of solid content. Within this range, the window film can prevent or reduce yellowing and deterioration of transparency.

The window film may further include an adhesive layer on a lower surface of the back coating layer 130a such that the window film can be directly attached to an upper surface of an element of a display, for example, a polarizing plate, a conductive film, or an organic light emitting diode, or the like. The adhesive layer is the same as the adhesive layer described above.

Next, a window film according to yet another embodiment of the present disclosure will be described.

The window film according to this embodiment is substantially the same as the window film 500 according to the above embodiment except that the back coating layer of the window film according to this embodiment may further include an antioxidant in order to reduce yellow index variation upon treatment for a long time at high temperature through improvement of thermal resistance. In some embodiments, the window film according to this embodiment has a yellow index variation of about 1.5 or less, for example, about 1.0 or less, or about 0.1 to about 1.0, as calculated by Equation 1. Within this range, the window film can exhibit good thermal resistance and thus can be used in a display:

$$\text{Yellow index variation} = (YI' - YI), \quad \text{Equation 1}$$

(wherein YI is an initial yellow index of a window film and YI' is a yellow index of the window film after being left at 80° C. for 1,000 hours).

The window film according to this embodiment has a YI of about −0.5 to about 3.5, for example, about 0.5 to about 2.0.

The antioxidant may include at least one selected from a phenol-based antioxidant, a phosphorus-based antioxidant including phosphate-based antioxidant, a thioether-based antioxidant, and an amine-based antioxidant. For example, the phenol-based antioxidant may include pentaerythritol tetrakis(3-(3,5-di-tert-butyl-4-hydroxyphenyl)propionate, octadecyl-3-(3,5-di-tertbutyl-4-hydroxyphenyl)propionate, N,N'-1,6-hexanediylbis[3,5-bis(1,1-dimethylethyl)-4-hydroxy]benzenepropanamide, and the like. The phosphorus-based antioxidant may include tris(2,4-ditert-butylphenyl) phosphite), bis(2,3-di-tertbutyl-6-methylphenyl)-ethylphosphite, bis(2,4-ditertbutylphenyl) pentaerythritoldiphosphite, 2,2',2"-nitrilo[triethyl-tris[3,3',5,5'-tetra-tertbutyl-1,1'-biphenyl-2,2'-diyl]phosphite], and the like. The thioether-based antioxidant may include didodecyl-3,3'-thiodipropionate, dioctadecyl 3,3'-thiodipropionate, and the like. The amine-based antioxidant may include styrenated diphenylamine, dioctyldiphenylamine, naphthylamine, and the like. The antioxidant may be present in an amount of about 0.1 parts by weight to about 20 parts by weight, for example, about 1 part by weight to about 10 parts by weight, based on 100 parts by weight of the UV curable group-containing resin. Within this range, the antioxidant can improve thermal resistance without (e.g., substantially without) affecting the dyes.

Next, a window film according to yet another embodiment of the present disclosure will be described.

The window film according to this embodiment is substantially the same as the window film 500 according to the above embodiment except that the back coating layer of the window film according to this embodiment may further include an antistatic agent. Thus, the window film according to this embodiment generates little static electricity in a wound state on a roll to provide good processability, does not require separate antistatic treatment on the base layer to provide antistatic effects even when including the base layer which has difficulty in antistatic treatment, and has low surface resistance. For example, the window film has a surface resistance of about $1 \times 10^{10}$ Ω/□ or less, for example, about $1 \times 10^5$ Ω/□ to about $5 \times 10^9$ Ω/□, as measured on the back coating layer. Within this range, the window film can provide good antistatic effects and good roll stability. The antistatic agent may include any suitable antistatic agents such as a conductive polymer, a quaternary ammonium salt, a phosphonium salt, sulfonate, an alkyl amine compound, a fatty ester, alkyl betaine, a metal oxide such as antimony tin oxide, and the like. In some embodiments, at least one selected from the conductive polymer, the quaternary ammonium salt, and the metal oxide such as antimony tin oxide may be included together with the dyes in the back coating layer, thereby providing antistatic effects while reducing the yellow index of the window film such that the window film does not appear yellow. The conductive polymer may include a water-soluble polyethylenedioxythiophene (PEDOT), which is a polythiophene-based polymer. For example, polyethylenedioxythiophene (PEDOT) having a molecular weight of 150,000 g/mol to 200,000 g/mol and doped with polystyrene sulfonate (PSS) as a dopant may be used. The quaternary ammonium salt may include a quaternary ammonium salt, such as tetrabutylammonium, in which four $C_1$ to $C_{10}$ alkyl groups are substituted. The antistatic agent may be present in an amount of about 0.001 parts by weight to about 30 parts by weight, for example, about 0.01 parts by weight to about 20 parts by weight, about 0.1 parts by weight to about 15 parts by weight, or about 0.5 parts by weight to about 10 parts by weight, based on 100 parts by weight of the UV curable group-containing resin. Within this range, the antistatic agent can improve thermal resistance without (e.g., substantially without) affecting the dyes.

The window film according to the embodiments may have a pencil hardness of about 6H or higher, for example, about 6H to about 8H, on a glass substrate. Within this range, the window film has no difference (e.g., substantially no difference) in pencil hardness both on a glass substrate and an adhesive layer, thereby providing high applicability.

The window film according to the embodiments may have a radius of curvature of about 10.0 mm or less, for example, about 0.1 mm to about 5.0 mm, in a compressive direction, and a radius of curvature of about 20.0 mm or less, or about 0.1 mm to about 10.0 mm, in a tensile direction. Within these ranges, the window film has good flexibility and can be used as a flexible window film. The window film according to the embodiments has low radii of curvature both in the compressive direction and in the tensile direction and thus can exhibit good flexibility in opposite sides thereof, thereby securing high applicability.

The window film according to the embodiments is optically transparent and can be used in a transparent display. In some embodiments, the window film has a transmittance of about 88% or higher, for example, about 88% to about 100%, and a haze of about 2% or less, or about 0.1% to about 2%, in the visible region, for example, in a wavelength range of about 400 nm to about 800 nm. Within this range, the window film is transparent.

The window film according to the embodiments has a thickness of about 50 μm to about 300 μm. Within this range, the window film can be used in an optical display.

Figure 6:
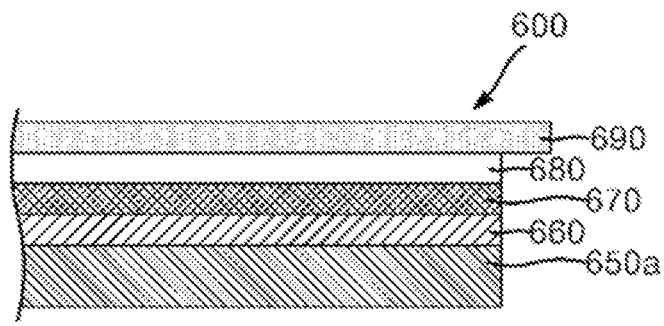
FIG. 6 is a cross-sectional view of a flexible display according to one embodiment of the present disclosure.
Figure 7:
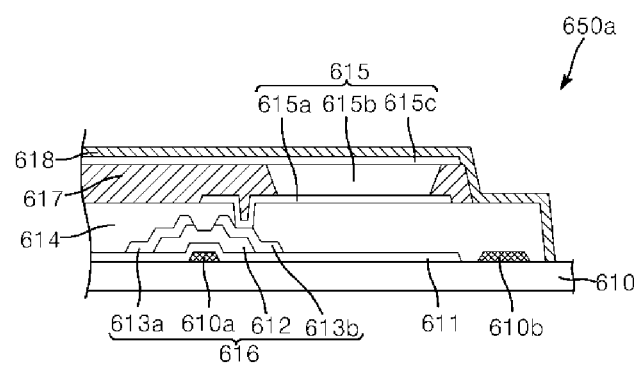
FIG. 7 is a cross-sectional view of one embodiment of a display unit of the flexible display of FIG. 6.

Next, a flexible display according to one embodiment of the present disclosure will be described with reference to FIG. 6 and FIG. 7. FIG. 6 is a cross-sectional view of a flexible display according to one embodiment of the present disclosure and FIG. 7 is a cross-sectional view of one embodiment of a display unit of the flexible display shown in FIG. 6.

Referring to FIG. 6, a flexible display 600 according to one embodiment includes a display unit 650a, an adhesive layer 660, a polarizing plate 670, a touchscreen panel 680, and a flexible window film 690. The flexible window film 690 may include the window film according to the embodiments of the present disclosure.

The display unit 650a serves to drive the flexible display 600, and may include a substrate and an optical device including an OLED, an LED or an LCD formed on the substrate. FIG. 7 is a cross-sectional view of one embodiment of a display unit of the flexible display shown in FIG. 6. Referring to FIG. 7, the display unit 650a may include a lower substrate 610, a thin film transistor 616, an organic light emitting diode 615, a planarization layer 614, a protective layer 618, and an insulation layer 617.

The lower substrate 610 supports the display unit 650a and may be formed with the thin film transistor 616 and the organic light emitting diode 615. The lower substrate 610 may also be provided with a flexible printed circuit board (FPCB) for driving the transparent electrode structure 680. The flexible printed circuit board may be further provided with a timing controller for driving an array of organic light emitting diodes, a power supply, and the like.

The lower substrate 610 may include a substrate formed from a flexible resin. For example, the lower substrate 610 may include a flexible substrate such as a silicon substrate, a polyimide substrate, a polycarbonate substrate, and a polyacrylate substrate, without being limited thereto.

In a display area of the lower substrate 610, a plurality of pixel domains are defined by a plurality of driving wires and a plurality of sensor wires intersecting each other and each of the pixel domains may be formed with an array of organic light emitting diodes, each of which includes the thin film transistor 616 and the organic light emitting diode 615 coupled to (e.g., connected to) the thin film transistor 616. In a non-display area of the lower substrate 610, a gate driver applying electric signals to the driving wires may be formed in the form of a gate-in panel. The gate-in panel unit is formed on one or both sides of the display area.

The thin film transistor 616 controls electric current flowing through a semiconductor by application of an electric field perpendicular (e.g., substantially perpendicular) to the electric current and may be formed on the lower substrate 610. The thin film transistor 616 may include a gate electrode 610a, a gate insulation layer 611, a semiconductor layer 612, a source electrode 613a, and a drain electrode 613b. The thin film transistor 616 may be an oxide thin film transistor which uses an oxide such as indium gallium zinc oxide (IGZO), ZnO, and TiO as the semiconductor layer 612, an organic thin film transistor which uses an organic material as the semiconductor layer, an amorphous silicon thin film transistor which uses amorphous silicon as the semiconductor layer, or a polycrystalline silicon thin film transistor which uses polycrystalline silicon as the semiconductor layer.

The planarization layer 614 covers the thin film transistor 616 and a circuit section 610b to flatten upper surfaces of the thin film transistor 616 and the circuit section 610b such that the organic light emitting diode 615 can be formed thereon. The planarization layer 614 may be formed of a spin-on-glass (SOG) film, a polyimide polymer, or a polyacrylic polymer, without being limited thereto.

The organic light emitting diode 615 realizes a display through self-emission, and may include a first electrode 615a, an organic light-emitting layer 615b, and a second electrode 615c, which are stacked in the stated order. Adjacent organic light emitting diodes may be isolated from each other by the insulation layer 617. The organic light emitting diode 615 may have a bottom emission type structure (a bottom emission kind of structure) wherein light generated from the organic light-emitting layer 615b is emitted through the lower substrate, or a top-emission type structure (a top-emission kind of structure) wherein light from the organic light-emitting layer 615b is emitted through the upper substrate.

The protective layer 618 covers the organic light emitting diode 615 to protect the organic light emitting diode 615. The protective layer 618 may be formed of an inorganic insulation material such as SiOx (1≤x≤2), SiNx (1≤x≤1.33), SiC, SiON, SiONC, and amorphous carbon (a-C), or an organic insulation material such as acrylate, epoxy polymers, imide polymers, and the like. For example, the protective layer 618 may include an encapsulation layer in which an inorganic material layer and an organic material layer are sequentially stacked once or a plurality of times.

Referring to FIG. 6 again, the adhesive layer 660 serves to attach the display unit 650a to the polarizing plate 670, and may be formed from an adhesive composition including a (meth)acrylate resin, a curing agent, an initiator, and a silane coupling agent.

The polarizing plate 670 can realize polarization of internal light or prevent or reduce reflection of external light to realize a display, or can increase contrast of the display. The polarizing plate 670 may be composed of a polarizer alone. In some embodiments, the polarizing plate 670 may include a polarizer and a protective film formed on one or both surfaces of the polarizer. In some embodiments, the polarizing plate 670 may include a polarizer and a protective coating layer formed on one or both surfaces of the polarizer. As the polarizer, the protective film and the protective coating layer, any suitable polarizer, any suitable protective film and any suitable protective coating layer available in the art may be used.

The touchscreen panel 680 generates electrical signals through detection of variation in capacitance when a human body or a conductor such as a stylus touches the touchscreen panel 680, and the display unit 650a may be driven by such electrical signals. The touchscreen panel 680 is formed by patterning a flexible conductive conductor, and may include first sensor electrodes and second sensor electrodes each formed between the first sensor electrodes and intersecting the first sensor electrodes.

The touchscreen panel 680 may include a conductive material such as metal nanowires, conductive polymers, and carbon nanotubes, without being limited thereto The window film 690 is formed as an outermost layer of the flexible display 600 to protect the display.

Adhesive layers may be further formed between the polarizing plate 670 and the touchscreen panel 680 and/or between the touchscreen panel 680 and the window film 690 to reinforce bonding between the polarizing plate, the touch screen panel, and the window film. The adhesive layers may be formed from an adhesive composition that includes a (meth)acrylic resin, a curing agent, an initiator, and a silane coupling agent. In addition, a polarizing plate may be disposed under the display unit 650a to realize polarization of internal light.

Figure 8:
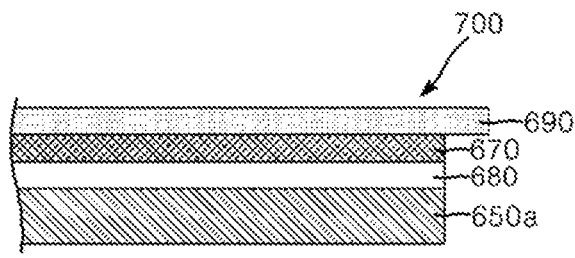
FIG. 8 is a cross-sectional view of a flexible display according to another embodiment of the present disclosure.

Next, a flexible display according to another embodiment of the present disclosure will be described with reference to FIG. 8. FIG. 8 is a cross-sectional view of a flexible display according to another embodiment of the present disclosure.

Referring to FIG. 8, a flexible display 700 according to this embodiment includes a display unit 650a, a touchscreen panel 680, a polarizing plate 670, and a flexible window film 690, which may include the window film according to the embodiments of the present disclosure. The flexible display 700 according to this embodiment is substantially the same as the flexible display according to the above embodiment except that the touchscreen panel 680 is directly formed on the display unit 650a. In this embodiment, the touchscreen panel 680 may be formed together with the display unit 650a. Thus, since the touchscreen panel 680 is disposed on the display unit 650a while being formed together with the display unit 650a, the flexible display 700 according to this embodiment has a smaller thickness than the flexible display according to the above embodiment, thereby providing better visibility. In this embodiment, the touchscreen panel 680 may be formed by deposition, without being limited thereto.

Adhesive layers may be further formed between the display unit 650a and the touchscreen panel 680, between the touchscreen panel 680 and the polarizing plate 670 and/or between the polarizing plate 670 and the window film 690 to reinforce bonding between the polarizing plate, the touch screen panel, and the window film. The adhesive layers may be formed from an adhesive composition that includes a (meth)acrylic resin, a curing agent, an initiator, and a silane coupling agent. In addition, a polarizing plate may be disposed under the display unit 650a to improve image quality of the display by realizing polarization of internal light.

Figure 9:
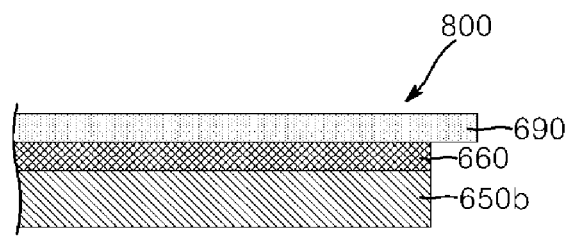
FIG. 9 is a cross-sectional view of a flexible display according to a further embodiment of the present disclosure.

Next, a flexible display according to a further embodiment of the present disclosure will be described with reference to FIG. 9. FIG. 9 is a cross-sectional view of a flexible display according to a further embodiment of the present disclosure.

Referring to FIG. 9, a flexible display 800 according to this embodiment includes a display unit 650b, an adhesive layer 660, and a flexible window film 690, which may include the window film according to the embodiments of the present disclosure. The flexible display 800 according to this embodiment is substantially the same as the flexible display according to the above embodiment except that the flexible display can be driven by the display unit 650b alone and does not include a polarizing plate and a touchscreen panel.

The display unit 650b may include a substrate and an optical device including an OLED, an LED or an LCD formed on the substrate. The display unit 650b may further include a touchscreen panel therein.

Although the flexible displays including the window films according to the embodiments of the present disclosure have been described above, it should be understood that the window films according to the embodiments of the present disclosure may also be applied to non-flexible displays.

Hereinafter, embodiments of the present disclosure will be described in more detail with reference to some examples. However, it should be noted that these examples are provided for illustration only and are not to be construed in any way as limiting the present disclosure.

EXAMPLE

Preparative Example 1: Composition for Window Coating Layer

A composition for window coating layers was prepared by placing 70.0 g of a siloxane resin-containing composition having a UV curable group (Epoxy Hybrimer, solid content: 90 wt %, a mixture of a silicon-based resin, an epoxy monomer and a photocationic initiator, Solip Co., Ltd.) and 30.0 g of methylethylketone in a flask, followed by stirring for 30 minutes and removing bubbles for 30 minutes.

Preparative Example 2: Composition for Back Coating Layer

A composition for back coating layers was prepared by placing 12.0 g of urethane acrylate (UA7619, Entis Co., Ltd.), 7.2 g of dipentaerythritol hexaacrylate (Entis Co., Ltd.), and 30.0 g of methylethylketone in a flask, followed by stirring for 30 minutes. 0.7 g of Irgacure 184 (BASF) was further added to the mixture, followed by stirring for 30 minutes.

Preparative Example 3: Composition for Back Coating Layer 10.6 g of urethane acrylate (HX-920UV, Kyoeisha Co., Ltd.), 2.1 g of dipentaerythritol hexaacrylate (Entis Co., Ltd.), 8.5 g of silica nanoparticle sol (Optisol-SST650U, solid content: 50 wt %, average particle diameter of silica nanoparticles: 12 nm, silica nanoparticle content: 4.3 g, Ranco Co., Ltd.), and 10.0 g of methylethylketone were mixed for 30 minutes by stirring. 0.4 g of Irgacure 184 (BASF) was further added to the mixture, followed by stirring for 30 minutes, thereby preparing a composition for back coating layers.

Preparative Example 4: Composition for Back Coating Layer 100 g of a monomer mixture comprising 95 mol % of 2-(3,4-epoxycyclohexyl)ethyltriethoxysilane (Shin-Etsu Co., Ltd.) and 5 mol % of dimethyldimethoxysilane (UMT Co., Ltd.) was placed in a 500 ml 3-neck flask. 0.5 mol % KOH and 1.48 mol % water were added to the silicon monomer mixture, followed by stirring at 25° C. for 1 hour and then stirring at 70° C. for 2 hours. A siloxane resin was prepared by removing remaining solvent using a vacuum distillation apparatus so as to have a solid content of 90 wt %. The siloxane resin had a weight average molecular weight of 5,000 g/mol, as measured by gel permeation chromatography. A composition for back coating layers was prepared by mixing 100 g of the prepared siloxane resin, 10 g of a crosslinkable monomer (CY-179), 2 g of an initiator (Irgacure 250, BASF), and 60 g of methylethylketone.

Preparative Example 5: Composition for Adhesive Layer

A composition for adhesive layers was prepared by placing 200 g of an acrylic adhesive resin (PS-06HE, Soken Co., Ltd.), 0.3 g of a curing agent (L-45, Soken Co., Ltd.), and 30 g of ethyl acetate in a flask, followed by stirring for 30 minutes. An adhesive layer formed from this composition has a storage modulus of 25 kPa at 25° C. and a glass transition temperature of −42° C. In order to prepare a specimen for measurement of storage modulus of the adhesive layer, the composition for adhesive layers was coated onto a release film and left at 35° C. and 45% RH for 24 hours to form a 50 μm thick adhesive film. Then, after removing the release film from each of the adhesive films, 8 adhesive films were stacked and cut into a circular (e.g., substantially circular) specimen having a thickness of 400 μm and a diameter of 8 mm. The storage modulus of the adhesive layer was measured at 25° C. under conditions of 1 rad/s with respect to the specimen on a disk having a diameter of 8 mm using a Physica MCR501 (Anton parr Co., Ltd.) while increasing temperature from −50° C. to 100° C.

Example 1

The composition for window coating layers prepared in Preparative Example 1 was applied to one surface of a 75 μm thick transparent polyimide film using a bar coating applicator, dried in an oven at 80° C. for 3 minutes, exposed to UV light at 500 mJ/cm², and subjected to post-curing at 120° C. for 24 hours. The composition for back coating layers prepared in Preparative Example 2 was applied to the other surface of the transparent polyimide film using a bar coating applicator. Then, the composition for back coating layers was dried in an oven at 80° C. for 2 minutes and exposed to UV light at 300 mJ/cm² under a nitrogen atmosphere, thereby preparing a window film including a window coating layer (thickness: 50 μm), a transparent polyimide film (thickness: 75 μm), and a back coating layer (thickness: 10 μm), which are sequentially stacked in the stated order.

Example 2

A window film was prepared in the same manner as in Example 1 except that the composition for back coating layers of Preparative Example 3 was used instead of the composition for back coating layers of Preparative Example 2.

Example 3

A window film was prepared in the same manner as in Example 1 except that the composition for back coating layers of Preparative Example 4 was used instead of the composition for back coating layers of Preparative Example 2.

Example 4

The composition for window coating layers prepared in Preparative Example 1 was applied to one surface of a 75 μm thick transparent polyimide film for base layers using a bar coating applicator, dried in an oven at 80° C. for 3 minutes, exposed to UV light at 500 mJ/cm², and subjected to post-curing at 120° C. for 24 hours. The composition for adhesive layers prepared in Preparative Example 5 was applied to the other surface of the transparent polyimide film for base layers using a bar coating applicator, followed by drying in an oven at 80° C. for 4 minutes, thereby forming an adhesive layer. Then, the composition for back coating layers prepared in Preparative Example 2 was applied to one surface of a 75 μm thick transparent polyimide film for support layers using a bar coating applicator, dried in an oven at 80° C. for 2 minutes, and exposed to UV light at 300 mJ/cm² under a nitrogen atmosphere, thereby forming a back coating layer on the one surface of the transparent polyimide film for support layers. The adhesive layer was attached to the other surface of the transparent polyimide film for support layers, thereby preparing a window film including a back coating layer (thickness: 20 μm), a transparent polyimide film (thickness: 75 μm) for support layers, an adhesive layer (thickness: 30 μm), a transparent polyimide film (thickness: 75 μm) for base layers, and a window coating layer (thickness: 50 μm), which are sequentially stacked in the stated order.

Example 5

A window film was prepared in the same manner as in Example 4 except that the composition for back coating layers of Preparative Example 3 was used instead of the composition for back coating layers of Preparative Example 2.

Example 6

A window film was prepared in the same manner as in Example 4 except that the composition for back coating layers of Preparative Example 4 was used instead of the composition for back coating layers of Preparative Example 2.

Example 7

The composition for window coating layers prepared in Preparative Example 1 was applied to one surface of a 75 μm thick transparent polyimide film using a bar coating applicator, dried in an oven at 80° C. for 3 minutes, exposed to UV light at 500 mJ/cm², and subjected to post-curing at 120° C. for 24 hours. The composition for adhesive layers prepared in Preparative Example 5 was applied to the other surface of the transparent polyimide film using a bar coating applicator. Then, the composition for adhesive layers was dried in an oven at 80° C. for 2 minutes and exposed to UV light at 300 mJ/cm² under a nitrogen atmosphere, thereby forming an adhesive layer. The composition for back coating layers of Preparative Example 3 was applied to one surface of a release film (polyethylene terephthalate film) using a bar coating applicator, followed by drying in an oven at 80° C. for 2 minutes and exposure to UV light at 300 mJ/cm² under a nitrogen atmosphere. A window film, which includes a back coating layer (thickness: 10 μm), an adhesive layer (thickness: 30 μm), a polyimide film (thickness: 75 μm), and a window coating layer (thickness: 50 μm) sequentially stacked in the stated order, was prepared by attaching the adhesive layer to the back coating layer and removing the release film.

Example 8

A window film was prepared in the same manner as in Example 7 except that the composition for back coating layers of Preparative Example 4 was used instead of the composition for back coating layers of Preparative Example 3.

Comparative Example 1

The composition for window coating layers prepared in Preparative Example 1 was applied to one surface of a 75 μm thick transparent polyimide film using a bar coating applicator, dried in an oven at 80° C. for 3 minutes, exposed to UV light at 500 mJ/cm², and subjected to post-curing at 120° C. for 24 hours, thereby preparing a window film having a window coating layer (thickness: 50 μm) and a transparent polyimide film (thickness: 75 μm) formed thereon.

The window films of Examples 1 to 8 and Comparative Example 1 were evaluated as to the properties of Table 1.

TABLE 1

|  | Comparative Example 1 | Example 1 | Example 2 | Example 3 | Example 4 | Example 5 | Example 6 | Example 7 | Example 8 |
|---|---|---|---|---|---|---|---|---|---|
| Pencil hardness | 8H | 8H | 8H | 8H | 8H | 8H | 8H | 8H | 8H |
| Pencil hardness on adhesive layer | H | 8H | 8H | 8H | 6H | 8H | 8H | 6H | 6H |
| Haze (%) | 1.05 | 0.89 | 1.06 | 0.92 | 0.98 | 1.03 | 0.93 | 1.03 | 0.93 |
| Total light transmittance (%) | 88.94 | 89.21 | 89.03 | 89.21 | 88.96 | 88.82 | 89.10 | 88.86 | 88.92 |
| Radius of curvature Compressive direction (mm) | 5 | 5 | 5 | 5 | 5 | 5 | 5 | 5 | 5 |
| Radius of curvature Tensile direction (mm) | 10 | 10 | 10 | 10 | 10 | 10 | 10 | 10 | 10 |
| Martens hardness on window coating layer (N/mm) | 137 | 222 | 252 | 255 | 181 | 204 | 201 | 173 | 176 |
| Elastic modulus on window coating layer (Mpa) | 1718 | 2858 | 3103 | 3092 | 2149 | 2572 | 2510 | 2102 | 2096 |
| Martens hardness on back coating layer (N/mm) | — | 108 | 117 | 120 | 82 | 99 | 92 | 72 | 76 |
| Elastic modulus on back coating layer (Mpa) | — | 1484 | 1611 | 1592 | 1208 | 1296 | 1285 | 1156 | 1182 |
| Martens hardness on base layer (N/mm) | 58 | — | — | — | — | — | — | — | — |
| Elastic modulus on base layer (Mpa) | 817 | — | — | — | — | — | — | — | — |

As shown in Table 1, the window films of the Examples exhibited good properties in terms of both pencil hardness on a glass substrate and pencil hardness on an adhesive layer. For example, the window films of Examples 1 to 3, 5 and 6 had the same pencil hardness on the glass substrate and on the adhesive layer. Further, as compared with the window film of Comparative Example 1 not including the back coating layer, the window films of the Examples including the back coating layer had the same radius of curvature and thus exhibited good flexibility to be used as a flexible window film. Further, the window films of the Examples had low haze and good transmittance despite the presence of the back coating layer therein.

Conversely, the window film of Comparative Example 1 not including the back coating layer had the same pencil hardness on the glass substrate as that of the window films of the Examples and lower pencil hardness on the adhesive layer than that of the window films of the Examples.

(1) Pencil hardness: Each of the window films prepared in the Examples and Comparative Example was cut into a specimen having a size of 50 mm×50 mm (length x width) and pencil hardness was measured on a window coating layer of the window film using a pencil hardness meter (Heidon-14EW, Shinto Scientific Co., Ltd.) in accordance with JIS K5400. Pencils of 6B to 9H (Mitsubishi Co., Ltd.) were used. Pencil hardness was measured under conditions of a scratch speed of 60 mm/min, a pencil pressing force of 19.6 N, a scratch angle (angle between a pencil and the window coating layer) of 45°, a pencil load of 1 kg, and a pencil scale of 10.0 mm. When the window coating layer has one or more scratches after being tested 5 times using a certain pencil, pencil hardness was measured again using another pencil having one-level lower pencil hardness than the previous pencil. A maximum value of pencil hardness allowing no scratch to be observed all five times on the window coating layer was taken as the pencil hardness of the window coating layer after pencil hardness was repeatedly measured five times.

(2) Pencil hardness on adhesive layer: The composition for adhesive layers prepared in Preparative Example 5 was deposited on a 2T soda lime glass substrate and cured to form a 50 μm thick adhesive layer. The adhesive layer was attached to a back coating layer or a base layer of each of the window films prepared in the Examples and Comparative Example to prepare a specimen, which in turn was measured as to pencil hardness by the same method as in (1).

(3) Haze and total light transmittance: Each of the window films was measured as to haze and total light transmittance using an NDH2000 (Nippon Denshoku Co., Ltd.) at a wavelength of 400 nm to 800 nm.

(4) Radius of curvature: Each of the window films (width×length: 3 cm×15 cm) was wound around a jig for testing a radius of curvature (Mandela flexing tester, Coretech Co., Ltd.), kept wound for 5 seconds or more, and then unwound from the jig. Next, the window film was observed with the naked eye to determine whether the window film had cracks. Here, a radius of curvature in a compressive direction was measured under a condition that a window coating layer of the window film contacted a surface of the jig, and a radius of curvature in a tensile direction was measured under a condition that a base layer of the window film contacted the jig. Measurement of the radius of curvature was performed while the diameter of the jig was gradually decreased from a maximum diameter, and a minimum radius of the jig causing no crack (or no observable cracks) on the window film was determined as a radius of curvature of the window film.

(5) Martens hardness on window coating layer and elastic modulus on window coating layer: Martens hardness and elastic modulus were measured on a window coating layer of each of the window film at 25° C. using a Fischer HM2000LT Micro Indenter (Fisher Co., Ltd.). The composition for adhesive layers prepared in Preparative Example 5 was deposited on a 2T soda lime glass substrate and cured to form a 50 μm thick adhesive layer. The adhesive layer was attached to each of the window films such that the window coating layer of the window film was placed at the outermost side, thereby preparing a specimen in which the window film was attached to the adhesive layer. Martens hardness and elastic modulus were measured by applying a constant force of 200 mN to the window coating layer of the specimen for 20 seconds using a micro indenter (Vickers indenter) having a straight diamond pyramid shape with a rectangular base, followed by creeping for 5 seconds and relaxation for 20 seconds.

(6) Martens hardness on back coating layer and elastic modulus on back coating layer: An adhesive layer was formed by the same method as in (5), and attached to each of the window films such that the back coating layer of the window film was placed at the outermost side, thereby preparing a specimen in which the window film was attached to the adhesive layer. Martens hardness and elastic modulus were measured by applying a constant force of 200 mN to the back coating layer of the specimen for 20 seconds by the same method as in (5), followed by creeping for 5 seconds and relaxation for 20 seconds.

(7) Martens hardness on base layer and elastic modulus on base layer: An adhesive layer was formed by the same method as in (5), and attached to each of the window films such that the base layer of the window film was placed at the outermost side, thereby preparing a specimen in which the window film was attached to the adhesive layer. Martens hardness and elastic modulus were measured by applying a constant force of 200 mN to the base layer of the specimen for 20 seconds by the same method as in (5), followed by creeping for 5 seconds and relaxation for 20 seconds.

Preparative Example 6: Composition for Back Coating Layer 3.6 g of a hexafunctional urethane acrylate (UP118, Entis Co., Ltd.) as a UV curable acryl resin, 1.2 g of trimethylolpropane triacrylate (Entis Co., Ltd.) as a trifunctional acryl monomer, 94 g of methylethylketone, and 0.05 g of tetraaza porphyrin dyes (KCF Blue b, maximum absorption wavelength: 596 nm, Kyung-ln Synthetic Co.) were mixed and stirred for 30 minutes. 0.2 g of a photo initiator (Irgacure 184, BASF) was added to the mixture and stirred for 30 minutes, thereby preparing a composition for back coating layers.

Preparative Example 7: Composition for Back Coating Layer 3.6 g of a hexafunctional urethane acrylate (UP118, Entis Co., Ltd.) as a UV curable acryl resin, 1.2 g of trimethylolpropane triacrylate (Entis Co., Ltd.) as a trifunctional acryl monomer, 94 g of methylethylketone, and 0.05 g of tetraaza porphyrin dyes (SK-D584, SK Chemical Co., Ltd., maximum absorption wavelength: 584 nm) were mixed and stirred for 30 minutes. 0.2 g of Irgacure 184 (BASF) as a photo initiator was added to the mixture and stirred for 30 minutes, thereby preparing a composition for back coating layers.

Preparative Example 8: Composition for Back Coating Layer 3.6 g of a hexafunctional urethane acrylate (UP118, Entis Co., Ltd.) as a UV curable acryl resin, 1.2 g of trimethylolpropane triacrylate (Entis Co., Ltd.) as a trifunctional acryl monomer, 94 g of methylethylketone, and 0.05 g of porphyrin dyes (PD-311S, Yamamoto Chemicals Inc., maximum absorption wavelength: 584 nm) were mixed and stirred for 30 minutes. 0.2 g of Irgacure 184 (BASF) as a photo initiator was added to the mixture and stirred for 30 minutes, thereby preparing a composition for back coating layers.

Preparative Example 9: Composition for Back Coating Layer 3.6 g of a hexafunctional urethane acrylate (UP118, Entis Co., Ltd.) as a UV curable acryl resin, 1.2 g of trimethylolpropane triacrylate (Entis Co., Ltd.) as a trifunctional acryl monomer, 94 g of methylethylketone, and 0.05 g of vanadium dyes (SK-D593, SK Chemical Co., Ltd., maximum absorption wavelength: 593 nm) were mixed and stirred for 30 minutes. 0.2 g of Irgacure 184 (BASF) as a photo initiator was added to the mixture and stirred for 30 minutes, thereby preparing a composition for back coating layers.

Preparative Example 10: Composition for Back Coating Layer 3.6 g of a hexafunctional urethane acrylate (UP118, Entis Co., Ltd.) as a UV curable acryl resin, 1.2 g of trimethylolpropane triacrylate (Entis Co., Ltd.) as a trifunctional acryl monomer, 94 g of methylethylketone, and 0.05 g of a mixture of porphyrin dyes and vanadium dyes (PANAX NEC 595, Ukseung Chemical Inc., maximum absorption wavelength: 595 nm) were mixed and stirred for 30 minutes. 0.2 g of Irgacure 184 (BASF) as a photo initiator was added to the mixture and stirred for 30 minutes, thereby preparing a composition for back coating layers.

Preparative Example 11: Composition for Window Coating Layer 50 g of 2-(3,4-epoxycyclohexyl)ethyltriethoxysilane (KBM-303, Shin-Etsu Chemical Co., Ltd.) was placed in a 200 ml 3-neck flask. Based on 2-(3,4-epoxycyclohexyl) ethyltriethoxysilane, 0.5 mol % KOH and 1.5 mol % water were added to the flask, followed by stirring at 25° C. for 1 hour and then stirring at 70° C. for 2 hours. A silicone resin was prepared by removing remaining solvent using a vacuum distillation apparatus so as to have a solid content of 90 wt %. The siloxane resin had a weight average molecular weight of 5,000 g/mol, as measured by gel permeation chromatography. A composition for window coating layers was prepared by mixing 100 g of the prepared siloxane resin, curable monomer 15 g of 3,4-epoxycyclohexylmethyl-3',4'-epoxycyclohexanecarboxylate (CY-179, Ciba Chemical Co., Ltd.), 2 g of diphenyliodonium hexafluorophosphate (Sigma Aldrich Co., Ltd.) as an initiator, and 60 g of methylethylketone.

Example 9

A back coating layer (thickness: 100 nm) was formed on one surface of a 75 μm thick transparent polyimide film by applying 3 ml of the composition for back coating layers prepared in Preparative Example 6 to one surface of a 75 μm thick transparent polyimide film, followed by spin coating at 500 rpm for 20 seconds, drying in an oven at 80° C. for 3 minutes, and exposure to UV light at 300 mJ/cm$^2$ under a nitrogen atmosphere. The composition for window coating layers prepared in Preparative Example 11 was applied to the other surface of the transparent polyimide film using a bar coating applicator. Then, the composition for window coating layers was dried in an oven at 80° C. for 3 minutes, exposed to UV light at 500 mJ/cm² under a nitrogen atmosphere, and subjected to post-curing at 120° C. for 24 hours, thereby preparing a window film including a window coating layer (thickness: 50 µm), a transparent polyimide film (thickness: 75 µm), and a back coating layer (thickness: 100 nm).

Example 10

A window film was prepared in the same manner as in Example 9 except that the composition for back coating layers of Preparative Example 7 was used instead of the composition for back coating layers of Preparative Example 6.

Example 11

A window film was prepared in the same manner as in Example 9 except that the composition for back coating layers of Preparative Example 8 was used instead of the composition for back coating layers of Preparative Example 6.

Example 12

A window film was prepared in the same manner as in Example 9 except that the composition for back coating layers of Preparative Example 9 was used instead of the composition for back coating layers of Preparative Example 6.

Example 13

A window film was prepared in the same manner as in Example 9 except that the composition for back coating layers of Preparative Example 10 was used instead of the composition for back coating layers of Preparative Example 6.

Comparative Example 2

The composition for window coating layers prepared in Preparative Example 11 was applied to one surface of a transparent polyimide film (thickness: 75 µm) using a bar coating applicator. Thereafter, the composition was dried in an oven at 80° C. for 3 minutes, exposed to UV light at 500 mJ/cm², and subjected to post-curing at 120° C. for 24 hours, thereby preparing a window film having a window coating layer (thickness: 50 µm) and a transparent polyimide film (thickness: 75 µm) formed thereon.

The window films of Examples 9 to 13 and Comparative Example 2 were evaluated as to the properties of Table 1.

TABLE 2

| | | Comparative Example | Example | | | | |
|---|---|---|---|---|---|---|---|
| | | 2 | 9 | 10 | 11 | 12 | 13 |
| Back coating layer | | — | Present | Present | Present | Present | Present |
| Dyes | | — | Present | Present | Present | Present | Present |
| Maximum absorption wavelength of dyes (nm) | | — | 596 | 584 | 584 | 593 | 595 |
| Pencil hardness | | 8H | 8H | 8H | 8H | 8H | 8H |
| Yellow index | | 5.65 | 0.24 | 0.69 | 0.89 | 1.14 | 0.94 |
| Total light transmittance (%) | | 88.94 | 89.24 | 89.28 | 89.00 | 89.08 | 88.82 |
| Haze (%) | | 0.94 | 0.80 | 0.88 | 0.85 | 0.87 | 0.73 |
| Radius of curvature | Compressive direction (mm) | 5 | 5 | 5 | 5 | 5 | 5 |
| | Tensile direction (mm) | 10 | 10 | 10 | 10 | 10 | 10 |
| b* value | | 3.39 | 0.42 | 0.48 | 0.61 | 0.67 | 0.63 |

As shown in Table 2, the window films of the Examples had low yellow indices and b* values according to embodiments of the present disclosure to prevent the window films from appearing yellow (or to reduce such yellowing), and had high total light transmittance and low haze, thereby providing good optical properties. Further, the window films of the Examples had high pencil hardness and low radii of curvature to be used in a flexible display.

Conversely, the window film of Comparative Example 2 not including the dyes had a high yellow index and a b* value out of embodiments of the present disclosure to allow the window film to appear yellow, and thus could not be used in a flexible display.

(1) Pencil hardness: Each of the window films prepared in the Examples and Comparative Example was cut into a specimen having a size of 50 mm×50 mm (length x width) and pencil hardness was measured on a window coating layer of the window film using a pencil hardness meter (Heidon-14EW, Shinto Scientific Co., Ltd.) in accordance with JIS K5400. Pencils of 6B to 9H (Mitsubishi Co., Ltd.) were used. Pencil hardness was measured under conditions of a scratch speed of 60 mm/min, a pencil pressing force of 19.6 N, a scratch angle (angle between a pencil and the window coating layer) of 45°, a pencil load of 1 kg, and a pencil scale of 10.0 mm. When the window coating layer has one or more scratches after being tested 5 times using a certain pencil, pencil hardness was measured again using another pencil having one-level lower pencil hardness than the previous pencil. A maximum value of pencil hardness allowing no scratch to be observed all five times on the window coating layer was taken as pencil hardness of the window coating layer after pencil hardness was repeatedly measured five times.

(2) Yellow index: Yellow index 1925[Recal] was measured with respect to the window film under a D65 light source at 2° (angle between the window coating layer and the light source) using a colorimeter (CM-3600d, Konica Minolta Co., Ltd.).

(3) Total light transmittance and Haze: Total light transmittance and haze were measured by the same method as described with respect to Table 1.

(4) Radius of curvature: Radius of curvature was measured by the same method as described with respect to Table 1.

(5) b* value: b* value was measured with respect to the window film under a D65 light source at 2° (angle between the window coating layer and the light source) using a colorimeter (CM-3600d, Konica Minolta Co., Ltd.).

Preparative Example 12: Composition for Back Coating Layer 3.6 g of a hexafunctional urethane acrylate (UP118, Entis Co., Ltd.) as a UV curable acryl resin, 1.2 g of trimethylolpropane triacrylate (Entis Co., Ltd.) as a trifunctional acryl monomer, 94 g of methylethylketone, 0.05 g of tetraaza porphyrin dyes (KCF Blue b, maximum absorption wavelength: 596 nm, Kyung-ln Synthetic Co.), and 0.1 g of Irganox-1010 (BASF) as a phenol-based antioxidant were mixed and stirred for 30 minutes. 0.2 g of a photo initiator (Irgacure 184, BASF) was added to the mixture and stirred for 30 minutes, thereby preparing a composition for back coating layers.

Preparative Examples 13 to 16

Composition for Back Coating Layer

Compositions for back coating layers were prepared in the same manner as in Preparative Example 12 except that antioxidants as listed in Table 3 were used instead of 0.1 g of Irganox-1010.

Preparative Example 17: Composition for Back Coating Layer

A first solution was prepared by dispersing 1.5 g of Baytron PH-500 (Bayer Co. Ltd., solid content: 1.2 wt %), which is a polyethylenedioxythiophene (PEDOTT:PSS) dispersion, for 10 minutes in a mixed solution of 17.4 g ethanol and 17.4 g ethoxy ethanol. 3.6 g of a hexafunctional urethane acrylate (UP118, Entis Co., Ltd.) as a UV curable acryl resin, 1.2 g of trimethylolpropane triacrylate (Entis Co., Ltd.) as a trifunctional acryl monomer, 17.4 g of isopropyl alcohol, 17.4 g of ethoxy ethanol, and 0.05 g of tetraaza porphyrin dyes (KCF Blue b, maximum absorption wavelength: 596 nm, Kyung-In Synthetic Co.) were mixed and stirred for 30 minutes. 0.2 g of a photo initiator (Irgacure 184, BASF) was added to the mixture and stirred for 30 minutes, thereby preparing a second solution. The first solution and the second solution were mixed and stirred for 30 minutes, thereby preparing a composition for back coating layers.

Preparative Example 18: Composition for Back Coating Layer 3.6 g of a hexafunctional urethane acrylate (UP118, Entis Co., Ltd.) as a UV curable acryl resin, 1.2 g of trimethylolpropane triacrylate (Entis Co., Ltd.) as a trifunctional acryl monomer, 94 g of methylethylketone, and 0.05 g of tetraaza porphyrin dyes (KCF Blue b, maximum absorption wavelength: 596 nm, Kyung-In Synthetic Co.) were mixed and stirred for 30 minutes. 0.2 g of a photo initiator (Irgacure 184, BASF) and 0.45 g of a quaternary ammonium antistatic agent (I-A2, solid content: 100 wt %, KOEI Co., Ltd.) were added to the mixture and stirred for 30 minutes, thereby preparing a composition for back coating layers.

Preparative Example 19: Composition for Back Coating Layer 3.6 g of a hexafunctional urethane acrylate (UP118, Entis Co., Ltd.) as a UV curable acryl resin, 1.2 g of trimethylolpropane triacrylate (Entis Co., Ltd.) as a trifunctional acryl monomer, 37.2 g of methylethylketone, 55.8 g of 1-methoxy-2-propanol, and 0.05 g of tetraaza porphyrin dyes (KCF Blue b, maximum absorption wavelength: 596 nm, Kyung-In Synthetic Co.) were mixed and stirred for 30 minutes. 0.2 g of a photo initiator (Irgacure 184, BASF) and 0.9 g of an ATO sol antistatic agent (XJB-0187, solid content: 40 wt %, Pelnox Co., Ltd.) were added to the mixture and stirred for 30 minutes, thereby preparing a composition for back coating layers.

Example 14

A back coating layer (thickness: 100 nm) was formed on one surface of a 75 μm thick transparent polyimide film by applying 3 ml of the composition for back coating layers prepared in Preparative Example 12 to one surface of the transparent polyimide film, followed by spin coating at 500 rpm for 20 seconds, drying in an oven at 80° C. for 3 minutes, and exposure to UV light at 300 mJ/cm² under a nitrogen atmosphere. The composition for window coating layers prepared in Preparative Example 11 was applied to the other surface of the transparent polyimide film using a bar coating applicator. Then, the composition for window coating layers was dried in an oven at 80° C. for 3 minutes, exposed to UV light at 500 mJ/cm² under a nitrogen atmosphere, and subjected to post-curing at 120° C. for 24 hours, thereby preparing a window film including a window coating layer (thickness: 50 μm), a transparent polyimide film (thickness: 75 μm), and a back coating layer (thickness: 100 nm).

Example 15 to Example 18

Window films were prepared in the same manner as in Example 14 except that the compositions for back coating layers as listed in Table 3 were used instead of the composition for back coating layers of Preparative Example 12.

Example 19 to Example 21

Window films were prepared in the same manner as in Example 14 except that the compositions for back coating layers as listed in Table 4 were used instead of the composition for back coating layers of Preparative Example 12.

The window films of Examples 15 to 18 were evaluated as to the properties of Tables 3 and 4.

(1) Pencil hardness: Each of the window films prepared in the Examples and Comparative examples was cut into a specimen having a size of 50 mm×50 mm (length x width) and pencil hardness was measured on a window coating layer of the window film using a pencil hardness meter (Heidon-14EW, Shinto Scientific Co., Ltd.) in accordance with JIS K5400. Pencils of 6B to 9H (Mitsubishi Co., Ltd.) were used. Pencil hardness was measured under conditions of a scratch speed of 60 mm/min, a pencil pressing force of 19.6 N, a scratch angle (angle between a pencil and the window coating layer) of 45°, a pencil load of 1 kg, and a pencil scale of 10.0 mm. When the window coating layer has one or more scratches after being tested 5 times using a certain pencil, pencil hardness was measured again using another pencil having one-level lower pencil hardness than the previous pencil. A maximum value of pencil hardness allowing no scratch to be observed all five times on the window coating layer was taken as pencil hardness of the window coating layer after pencil hardness was repeatedly measured five times.

(2) Initial yellow index: Yellow index 1925[Recal] was measured with respect to the window film under a D65 light source at 2° (angle between the window coating layer and the light source) using a colorimeter (CM-3600d, Konica Minolta Co., Ltd.).

(3) Yellow index variation: Initial yellow index of each of the window films was measured by the same method as in (2). The window film was left in an oven at 80° C. for 1,000 hours, followed by measurement of yellow index by the same method as in (2). Yellow index variation was calculated according to Equation 1.

(4) Haze and total light transmittance: Each of the window films was measured as to haze and total light transmittance using an NDH2000 (Nippon Denshoku Co., Ltd.) at a wavelength of 400 nm to 800 nm.

(5) Radius of curvature: Each of the window films (width×length: 3 cm×15 cm) was wound around a jig for testing a radius of curvature (Mandela flexing tester, Coretech Co., Ltd.), kept wound for 5 seconds or more, and then unwound from the jig. Next, the window film was observed with the naked eye to determine whether the window film had cracks. Here, a radius of curvature in a compressive direction was measured under a condition that a window coating layer of the window film contacted a surface of the jig, and a radius of curvature in a tensile direction was measured under a condition that a back coating layer or a base layer of the window film contacted the jig. Measurement of the radius of curvature was performed while the diameter of the jig was gradually decreased from a maximum diameter, and a minimum radius of the jig causing no crack (or no observable cracks) on the window film was determined as a radius of curvature of the window film.

(6) b* value: b* value was measured with respect to the window film under a D65 light source at 2° (angle between the window coating layer and the light source) using a colorimeter (CM-3600d, Konica Minolta Co., Ltd.).

(7) Surface resistance: Surface resistance was measured on the back coating layer of each of the window films at 22° C. and 55% RH using a high ohmmeter (MCT-HT450, Mitsubishi).

(8) Static electricity: Static electricity was measured on the back coating layer of each of the window films using an electrostatic voltmeter (SK-H050, KEYENCE Co., Ltd.) at a speed of 1 rpm in a wound state on a 400 mm width roll. A distance between a probe of the electrostatic voltmeter and the window film was set to 25 mm. Measurement was performed three times and an average value of absolute values was obtained.

TABLE 3

| | | Example | | | |
|---|---|---|---|---|---|
| | 14 | 15 | 16 | 17 | 18 |
| Back coating layer | Present | Present | Present | Present | Present |
| Kind of back coating layer | Preparative Example 12 | Preparative Example 13 | Preparative Example 14 | Preparative Example 15 | Preparative Example 16 |
| Dyes | Tetraaza porphyrin dye[1] | Tetraaza porphyrin dye[1] | Tetraaza porphyrin dye[1] | Tetraaza porphyrin dye[1] | Tetraaza porphyrin dye[1] |
| Maximum absorption wavelength of dyes (nm) | 596 | 596 | 596 | 596 | 596 |
| Antioxidant | Phenol-based antioxidant[2] | Phosphorus-based antioxidant[3] | Thioether-based antioxidant[4] | Phenol + Phosphorus based antioxidant mixture[5] | Phenol + thioether based antioxidant mixture[6] |
| Pencil hardness | 8H | 8H | 8H | 8H | 8H |
| Initial yellow index | 0.24 | 0.25 | 0.22 | 0.23 | 0.26 |
| Yellow index variation | 0.56 | 0.72 | 0.81 | 0.14 | 0.21 |
| Total light transmittance (%) | 89.13 | 89.14 | 89.23 | 89.15 | 89.19 |
| Haze (%) | 0.69 | 0.84 | 0.91 | 0.79 | 0.81 |
| Radius of curvature Compressive direction (mm) | 5 | 5 | 5 | 5 | 5 |
| Radius of curvature Tensile direction (mm) | 10 | 10 | 10 | 10 | 10 |
| b* value | 0.42 | 0.43 | 0.41 | 0.42 | 0.43 |

[1]0.05 g of KCF Blue b (maximum absorption wavelength: 596 nm, Kyung-In Synthetic Co.)
[2]0.1 g of Irganox-1010 (BASF)
[3]0.1 g of Irgafos-168 (BASF)
[4]0.1 g of Irganox-PS800 (BASF)
[5]Mixture of 0.1 g of Irganox-1010 (BASF) and 0.05 g of Irgafos-168 (BASF)
[6]Mixture of 0.1 g of Irganox-1010 (BASF) and 0.05 g of Irganox-PS800(BASF)

TABLE 4

| | Comparative Example | Example | | |
|---|---|---|---|---|
| | 2 | 19 | 20 | 21 |
| Back coating layer | — | Present | Present | Present |
| Kind of back coating layer | — | Preparative Example 17 | Preparative Example 18 | Preparative Example 19 |
| Dyes | — | Tetraaza porphyrin dye [1] | Tetraaza porphyrin dye [1] | Tetraaza porphyrin dye [1] |
| Maximum absorption wavelength of dyes (nm) | — | 596 | 596 | 596 |
| Antistatic agent | — | Conductive polymer | Quaternary ammonium salt | ATO |
| Pencil hardness | 8H | 8H | 8H | 8H |
| Initial yellow index | 5.65 | 0.12 | 0.23 | 0.19 |
| Surface resistance ($\Omega/\square$) | $1.26 \times 10^{14}$ | $1.26 \times 10^{6}$ | $1.02 \times 10^{9}$ | $4.14 \times 10^{9}$ |
| Static electricity (kV) | 300 | 0.9 | 1.5 | 2.3 |
| Total light transmittance (%) | 88.94 | 89.22 | 89.26 | 89.10 |
| Haze (%) | 0.94 | 0.81 | 0.72 | 0.94 |
| Radius of curvature — Compressive direction (mm) | 5 | 5 | 5 | 5 |
| Radius of curvature — Tensile direction (mm) | 10 | 10 | 10 | 10 |

[1] KCF Blue b (maximum absorption wavelength: 596 nm, Kyung-In Synthetic Co.)

As can be seen from Table 3, the window films of the Examples had high thermal resistance to exhibit a low yellow index variation even after being left at high temperature for a long period of time, and thus could be used in a display.

In addition, as can be seen from Table 4, the window films of the Examples had good antistatic resistance to exhibit good roll stability.

As shown in Table 1, Table 2, Table 3 and Table 4, embodiments of the present disclosure provide a window film having high pencil hardness both on a glass substrate and on an adhesive layer. Embodiments of the present disclosure provide a window film having good optical properties such as transparency. Embodiments of the present disclosure provide a window film having good flexibility. Embodiments of the present disclosure provide a window film exhibiting good flexibility in opposite directions thereof. Embodiments of the present disclosure provide a window film having a low yellow index to prevent the window film from appearing yellow (or to reduce such yellowing). Embodiments of the present disclosure provide a window film having high pencil hardness. Embodiments of the present disclosure provide a window film, which has high thermal resistance to exhibit low yellow index variation even after being left at high temperature for a long period of time, and thus can be used in a display. Embodiments of the present disclosure provide a window film having good antistatic properties to exhibit good roll stability.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that various modifications, changes, alterations, and equivalent embodiments can be made by those skilled in the art without departing from the spirit and scope of the present disclosure as defined by the appended claims, and equivalents thereof.

What is claimed is:

1. A window film, comprising
a base layer;
a window coating layer only on one surface of the base layer; and
a back coating layer formed only on another surface of the base layer,
wherein the window coating layer is formed from a composition for window coating layers comprising a silicon-based resin, the silicon-based resin being present in an amount of about 65 wt % to about 95 wt %,
wherein the window film has an elastic modulus on the back coating layer of about 1,000 Mpa or more and has a pencil hardness on an adhesive layer of about 6H or higher,
wherein the back coating layer is formed from a composition comprising a UV curable group-containing resin,
wherein the UV curable group-containing resin comprises at least one selected from a (meth)acrylic resin comprising a UV curable group and a siloxane resin comprising a UV curable group,
wherein the siloxane resin comprising the UV curable group comprises a siloxane resin represented by Formula 3-2 or Formula 3-3:

$(R^7SiO_{3/2})_x(R^8SiO_{3/2})_y$   Formula 3-2 wherein $R^7$ and $R^8$ are each independently a UV curable group and different from each other, $0.20 \leq x \leq 0.999$, $0.001 \leq y \leq 0.80$, and $x+y=1$, $(R^7SiO_{3/2})_x(R^9R^{10}SiO_{2/2})_z$   Formula 3-3 wherein $R^7$ is a UV curable group; $R^9$ and $R^{10}$ are each independently hydrogen, a UV curable group, a substituted or unsubstituted $C_1$ to $C_{20}$ alkyl group, or a substituted or unsubstituted $C_5$ to $C_{20}$ cycloalkyl group; $0<x<1$, $0<z<1$, and $x+z=1$.

2. The window film according to claim 1, wherein the window film has a pencil hardness of about 6H or higher.

3. The window film according to claim 1, wherein the window film has a radius of curvature in a compressive direction of about 10.0 mm or less and a radius of curvature in a tensile direction of about 20.0 mm or less.

4. The window film according to claim 1, wherein the window film has Martens hardness on the back coating layer of about 50 N/mm to about 200 N/mm.

5. The window film according to claim 1, wherein the window coating layer has a thickness of about 5 μm to about 150 μm.

6. The window film according to claim 1, wherein the back coating layer has a thickness of about 1 μm to about 100 μm.

7. The window film according to claim 1, wherein the adhesive layer has a storage modulus of about 10 kPa to about 50 kPa at 25° C.

8. The window film according to claim 1, further comprising: an adhesive layer on a lower surface of the back coating layer.

9. The window film according to claim 1, further comprising: at least one selected from an adhesive layer and a support layer.

10. The window film according to claim 9, wherein the adhesive layer comprised in the window film has a thickness of about 10 μm to about 100 μm.

11. The window film according to claim 9, wherein the support layer is a film formed from a resin having the same composition as that of the base layer.

12. The window film according to claim 1, wherein the window coating layer is directly on a surface of the base layer and the back coating layer is directly on another surface of the base layer.

13. The window film according to claim 1, further comprising: an adhesive layer formed between the base layer and the back coating layer.

14. The window film according to claim 1, further comprising: a stack structure comprising an adhesive layer and a support layer between the base layer and the back coating layer.

15. The window film according to claim 1, wherein at least one selected from the base layer, the window coating layer, and the back coating layer comprises a dye having a maximum absorption wavelength of about 500 nm to about 650 nm.

16. The window film according to claim 15, wherein the dye has a maximum absorption wavelength of about 550 nm to about 620 nm.

17. The window film according to claim 15, wherein the dye comprises at least one selected from cyanine, porphyrin, arylmethane, squarylium, azomethine, oxonol, azo, xanthene, merocyanine, and vanadium dyes.

18. The window film according to claim 15, wherein the dye is contained in the back coating layer and the dye is present in an amount of about 0.001 wt % to about 15 wt % in the composition for back coating layers in terms of solid content.

19. The window film according to claim 15, wherein the dye is contained in the back coating layer, and the back coating layer is formed from a composition for back coating layers comprising the dye, the UV curable group-containing resin, a crosslinking agent and an initiator.

20. The window film according to claim 15, wherein the back coating layer has a thickness of about 100 nm or less.

21. The window film according to claim 15, wherein the dye is contained in the back coating layer, the back coating layer further comprising at least one selected from an antioxidant and an antistatic agent.

22. The window film according to claim 15, wherein the base layer is formed from at least one selected from a polyester resin, a polycarbonate resin, a poly(meth)acrylate resin, a polystyrene resin, a polyamide resin, and a polyimide resin.

23. The window film according to claim 15, further comprising: an adhesive layer on a lower surface of the back coating layer.

24. The window film according to claim 15, wherein the window film has a yellow index of about −2.5 to about 3.5.

25. The window film according to claim 15, wherein the window film has a b* value of about −2.5 to about 2.5.

26. The window film according to claim 15, wherein the window coating layer is directly on a surface of the base layer, the back coating layer is directly on another surface of the base layer, the dye is contained in the back coating layer, and the base layer comprises a polyimide resin film.

27. A flexible display comprising the window film according to claim 1.

* * * * *